US006683721B2

(12) United States Patent
Copner et al.

(10) Patent No.: US 6,683,721 B2
(45) Date of Patent: Jan. 27, 2004

(54) LOW DISPERSION INTERLEAVER

(75) Inventors: Nigel Copner, Fremont, CA (US); Kim Leong Tan, Sunnyvale, CA (US); Christopher John Abraham, Mountain View, CA (US); Thomas Ducellier, Ottawa (CA); Marie Josee Picard, Ottawa (CA)

(73) Assignee: JDS Uniphase Corporation, San Jose, CA (US)

( * ) Notice: Subject to any disclaimer, the term of this patent is extended or adjusted under 35 U.S.C. 154(b) by 82 days.

(21) Appl. No.: 10/058,534

(22) Filed: Jan. 28, 2002

(65) Prior Publication Data

US 2002/0171908 A1 Nov. 21, 2002

Related U.S. Application Data

(60) Provisional application No. 60/271,428, filed on Feb. 27, 2001, and provisional application No. 60/293,985, filed on May 30, 2001.

(51) Int. Cl.[7] ............ G02B 27/10; G02F 1/01; G02F 1/035
(52) U.S. Cl. .............. 359/618; 359/279; 385/2
(58) Field of Search ................ 359/237, 238, 359/245, 279, 618, 629; 385/2, 3, 8

(56) References Cited

U.S. PATENT DOCUMENTS

| 3,611,436 | A | * | 10/1971 | Rigrod | 372/20 |
|---|---|---|---|---|---|
| 6,125,220 | A | | 9/2000 | Copner et al. | 385/27 |
| 6,169,604 | B1 | | 1/2001 | Cao | 356/519 |
| 6,169,626 | B1 | | 1/2001 | Chen et al. | 359/279 |
| 6,169,828 | B1 | | 1/2001 | Cao | 385/31 |
| 6,252,716 | B1 | | 6/2001 | Paiam | 359/618 |
| 6,281,977 | B1 | | 8/2001 | Paiam et al. | 356/480 |
| 6,559,992 | B2 | * | 5/2003 | Zhou et al. | 398/158 |
| 2002/0122614 | A1 | * | 9/2002 | Zhou et al. | 385/15 |

* cited by examiner

Primary Examiner—Ricky Mack
(74) Attorney, Agent, or Firm—Allen, Dyer, Doppelt, Milbrath & Gilchrist, P.A.

(57) ABSTRACT

The present invention relates to an interferometer useful in the interleaving and de-interleaving of optical wavelength channels. Typically the invention comprises a beamsplitter and two resonators, e.g. GT etalons or ring resonators. The beamsplitter splits an input beam of light into a first sub-beam directed to follow a first path and a second sub-beam directed to follow a second path. The first resonator has a first effective cavity length and receives the first sub-beam. The second resonator has a second effective cavity length and receives the second sub-beam. The first path and the second path have an effective optical path difference approximately equal to one-half the first effective cavity length. In one embodiment, the front plates of the GT etalons each have a different reflectivity, and are selected to provide a desired spectral response. In another embodiment, the two resonators are slightly de-phased from one another such that the positive dispersion slope of the first resonator is aligned with the negative dispersion slope of the second resonator. Polarization-based versions of the invention are disclosed, in which a single resonator receives both sub-beams, which are orthogonally polarized. Single etalon versions of the invention are also possible, in which a beam is separated into sub-beams (i.e. reflected and transmitted beams) within a non-linear interferometer, and then re-combined outside the interferometer with the appropriate effective optical path length delay therebetween.

28 Claims, 33 Drawing Sheets

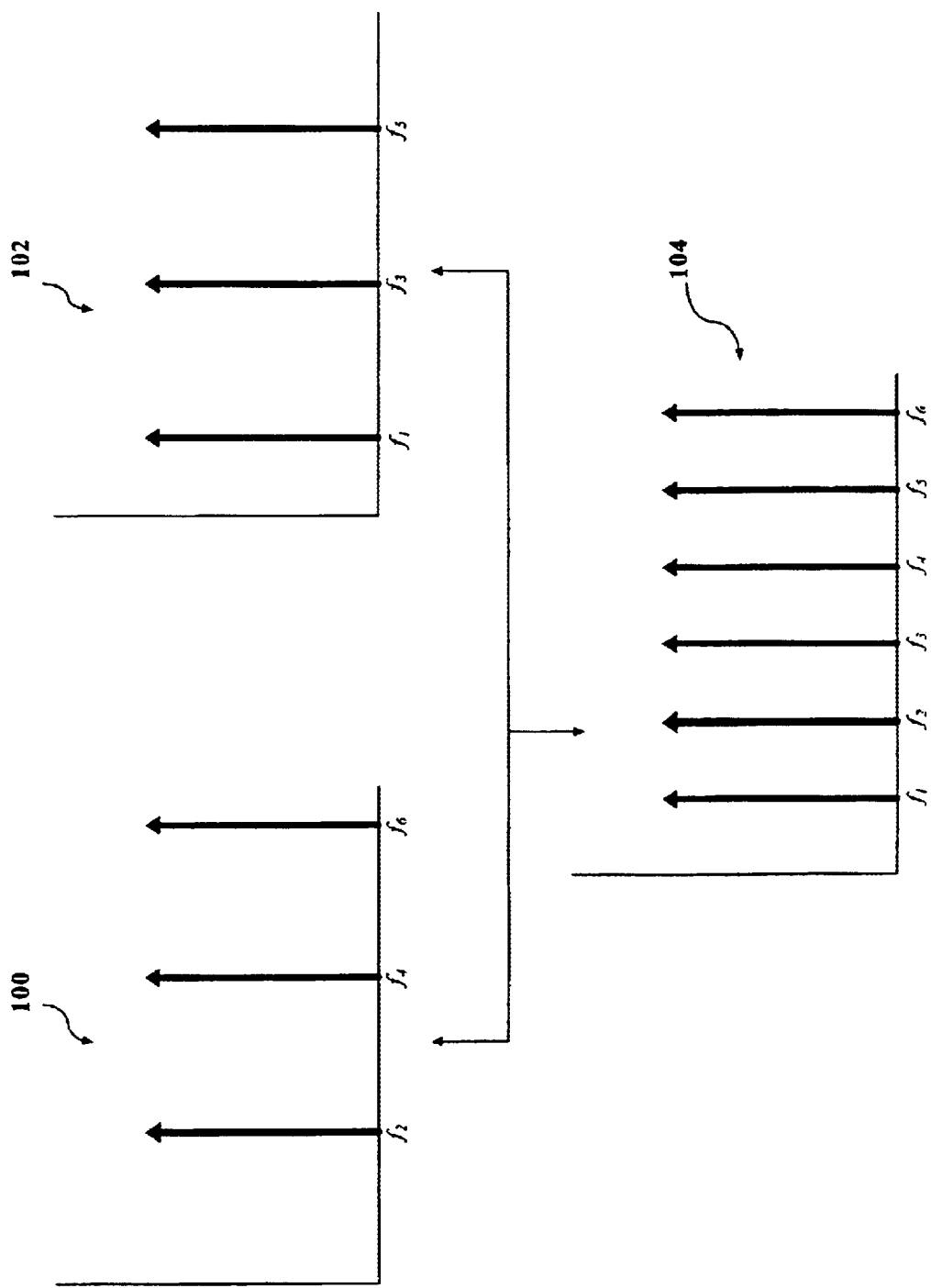

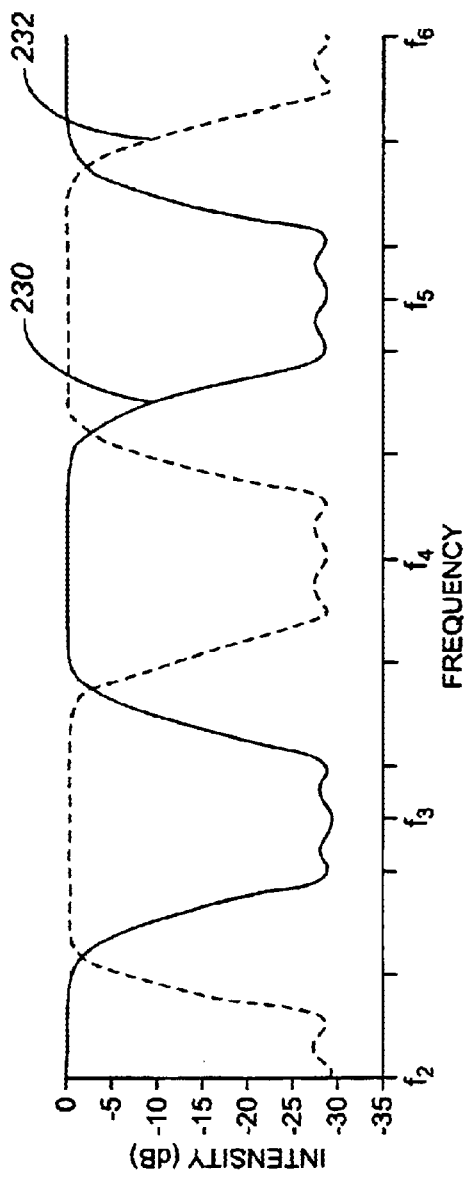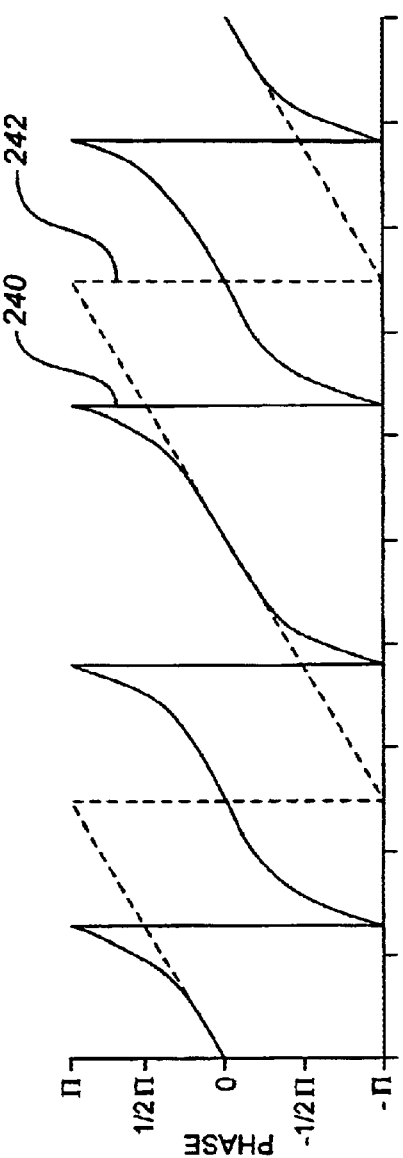

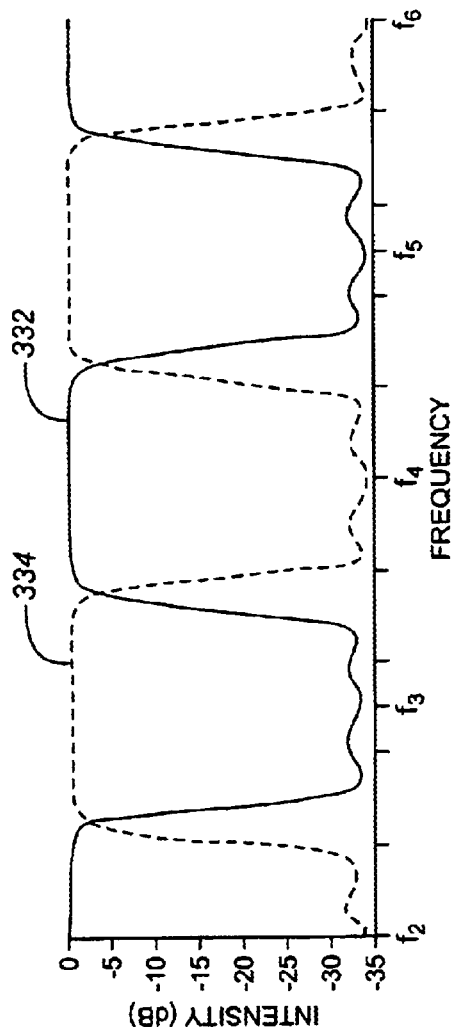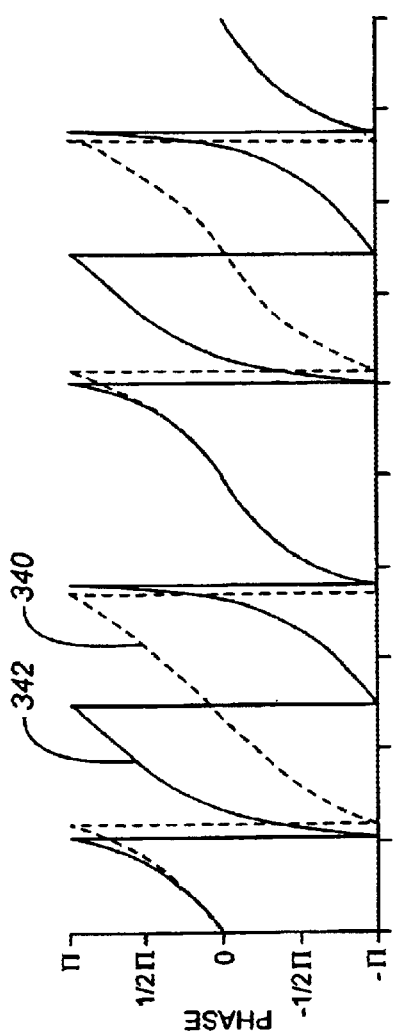

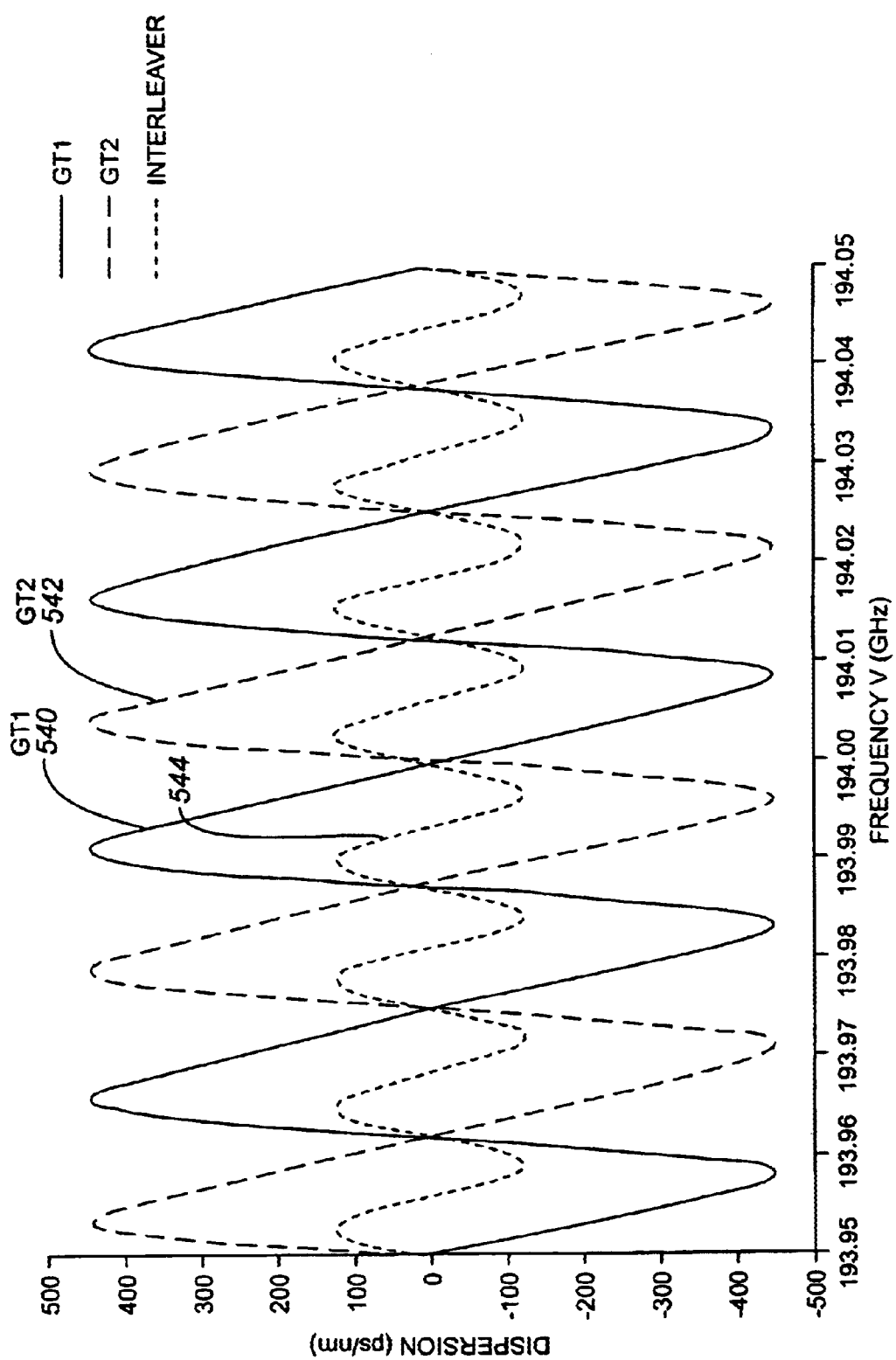

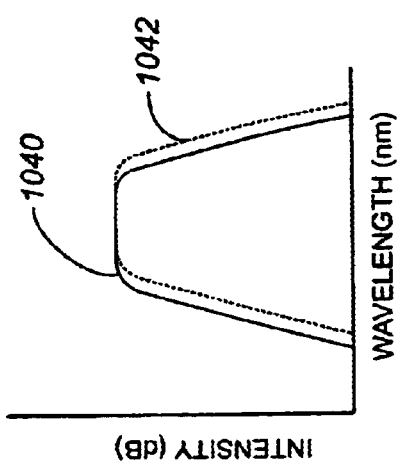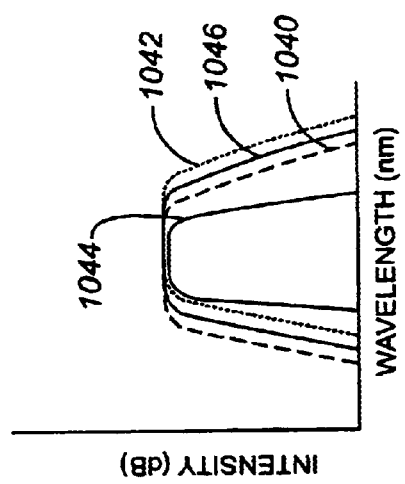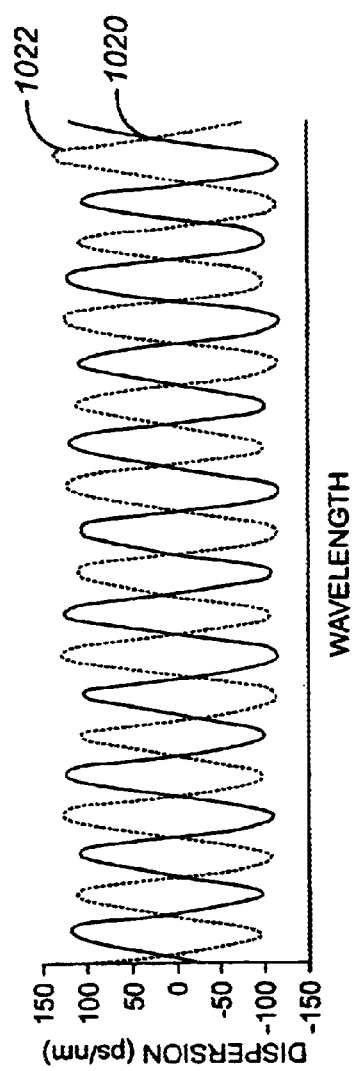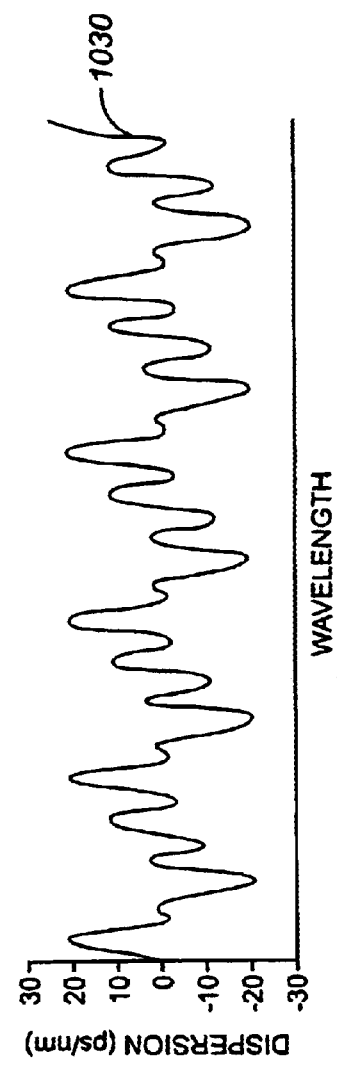
FIG. 10b
FIG. 10c
FIG. 10d
FIG. 10e

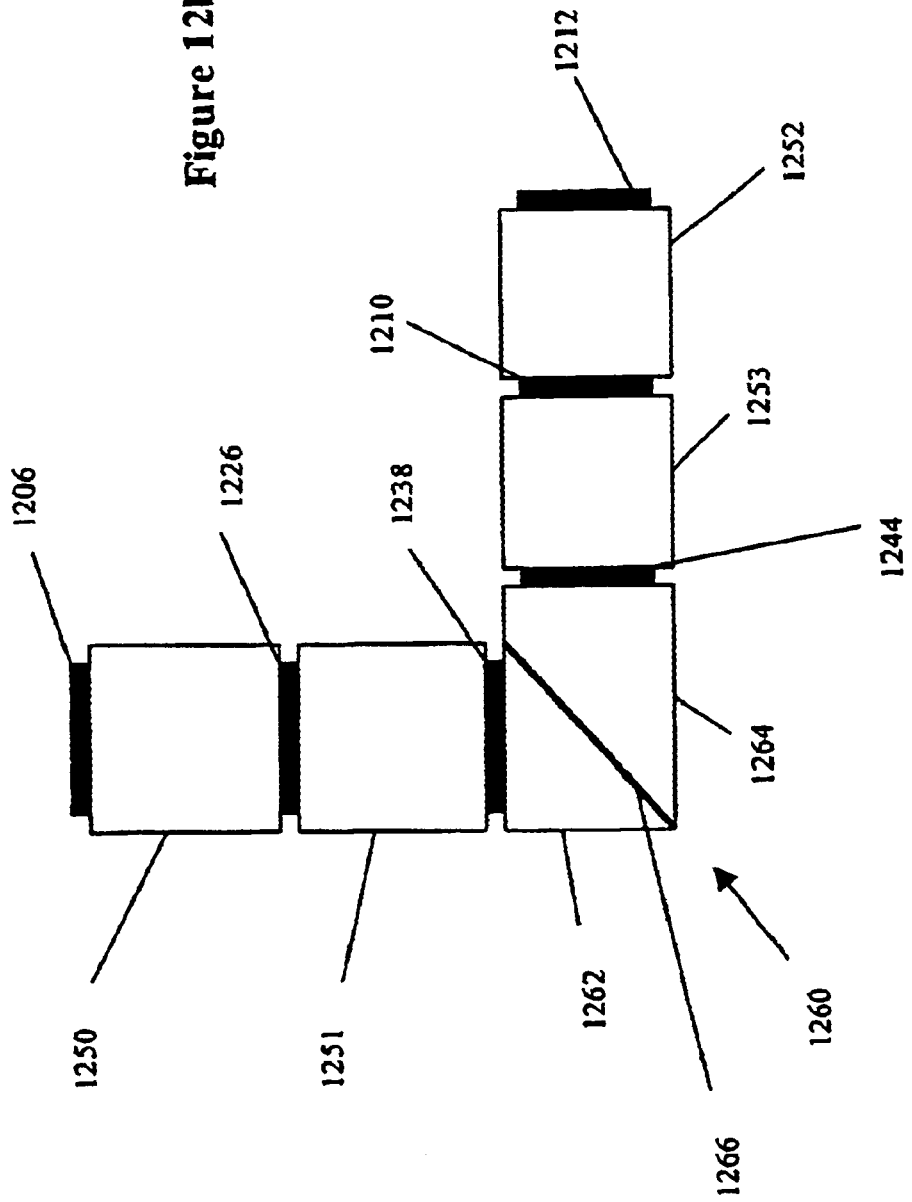

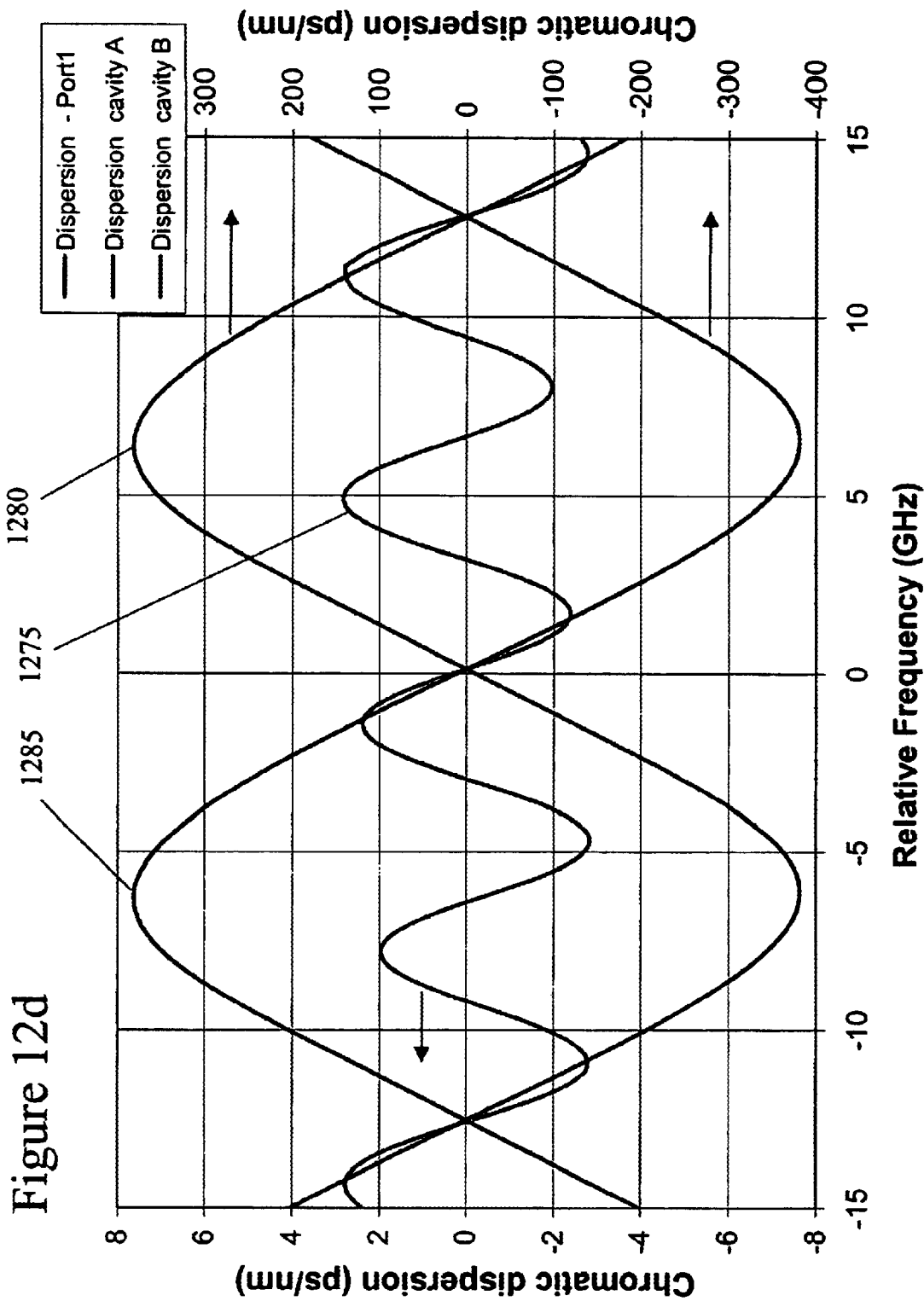

LOW DISPERSION INTERLEAVER

CROSS REFERENCE TO RELATED APPLICATIONS

This application claims priority from U.S. patent application Ser. No. 60/271,428 filed Feb. 27, 2001 and application Ser. No. 60/293,985 filed May 30, 2001.

BACKGROUND OF THE INVENTION

This invention relates to interferometers for use in optical communication networks, and more specifically to optical signal interleavers/deinterleavers designed to produce greatly reduced amounts of chromatic dispersion.

In multiplexed optical communication networks, a single optical fiber typically carries multiple independent data channels with each data channel assigned to a different optical wavelength. Such networks are referred to as wavelength division multiplexed (WDM) networks. As signals propagate through the network, data for different channels may be separated or combined using an optical frequency filter, in particular, an interleaver/deinterleaver (hereafter "interleaver").

An interleaver is a type of optical multiplexer which, when operating as an interleaver, combines subsets of channels from different fibers into a single optical beam. When operating as a deinterleaver, the interleaver separates a single optical beam having a series of channels into two or more subset series of channels. Typically, an interleaver is used to separate or combine even and odd International Telecommunications Union (ITU) channels.

FIG. 1 conceptually illustrates the function of an interleaver. When operating as an interleaver, the interleaver receives a first optical beam 100, which comprises a number of even channels at frequencies $f_2$, $f_4$, $f_6$. The frequencies of each channel are such that each of these channels is separated by the same amount, e.g. 100 GHz. The interleaver also receives a second optical beam 102, which comprises a number of odd channels at frequencies $f_1$, $f_3$, $f_5$. Similar to beam 100, the frequencies of each of these channels are such that these channels are separated by the same amount, e.g. 100 GHz. The even and odd channels, however, are offset from each other, normally an amount equal to half their separation distances, e.g. 50 GHz. The interleaver then interleaves the beams 100 and 102 to generate a beam 104 with the channels $f_1$, $f_2$, $f_3$, $f_4$, $f_5$, $f_6$, which are separated by 50 GHz. When operated as a deinterleaver, beam 104 is received and divided into beams 100 and 102.

Optical frequency interleavers are widely recognized as key components enabling the rapid expansion of WDM networks to higher channel counts and narrower channel spacing, while preserving inter-channel cross-talk performance, in combination with existing demultiplexer technologies. Because of the periodic frequency nature of the International Telecommunications Union (ITU) grid, interleavers tend to be constructed from combinations of one or more interferometric structures, such as etalons and Mach-Zehnder interferometers. The desirable features of interleaver pass bands include a flattop and high isolation in the stop-band.

A Michelson interferometer uses a beamsplitter and two reflecting mirrors to separate wavelengths of a light signal into different optical paths. This type of interferometer provides a linear phase ramp dependent on the optical path difference between the two arms of the interferometer. The linear phase ramp generates a non-flat top response with no chromatic dispersion.

Another type of interferometer, invented by Dingel, is a Michelson interferometer in which the mirror of one arm is replaced by a Gires-Tournois (GT) etalon. As shown in FIG. 2, an interferometer 200 comprises a beam splitter 202 (typically an approximately 50/50 splitter), a plate 204 with a highly reflective (near 100%) coating 206 placed in one arm with spacers 207a and 207b preferably made from ultra low expansion material (ULE). A GT etalon 220 is placed in the other arm. The GT etalon 220 comprises a front plate 208 with a partially reflective (e.g., 15% reflectivity) coating 210, spacers 211a and 211b preferably made from ultra low expansion material (ULE) and a back plate 214 with a highly reflective (near 100%) coating 212. As shown, a gap of distance d separates front plate 208 and back plate 214 of the GT etalon 220. Further, the GT etalon 220 is placed a distance $L_2$ from the beam splitter 202, and the plate 206 is placed a distance $L_1$ from the beam splitter 202.

When this set-up is used in an interleaver for deinterleaving channels, an incident beam $B_1$ comprising, for example, ITU even and odd channels is directed towards beam splitter 202. Beam $B_1$ is split at splitter interface 222 into a beam $B_3$ and beam $B_2$. Beam $B_3$ is directed towards plate 204 with highly reflective coating 206, while beam $B_2$ is directed towards GT etalon 220. Because of the near 100% reflectivity of reflective coating 206, beam $B_3$ is reflected back to splitter 202. Beam $B_3$ experiences a linear phase change per wavelength based upon the distance traveled from the splitter interface to plate 204 and back. An exemplary linear phase ramp of beam $B_3$ at splitter interface 222 is illustrated in FIG. 2c as line 242.

Likewise, because of the near 100% reflectivity of reflective coating 212, beam $B_2$ is reflected back to splitter 202. However, in addition to experiencing a linear phase change per wavelength based upon the distance traveled, beam $B_2$ also experiences a non-linear phase change from GT etalon 220 of, $$\Phi = -2\tan^{-1}\left[\frac{1-\sqrt{R}}{1+\sqrt{R}}\tan\left(\frac{2\pi\eta d}{\lambda}\right)\right]$$

where R is the power of reflectance of coating 210, $\lambda$ is the vacuum wavelength and $\eta$ is the refractive index of the material inside GT etalon 220. Typically, the material inside GT etalon 220 is air, resulting in a refractive index $\eta$ equal to approximately 1. An exemplary non-linear phase ramp of beam $B_2$ at splitter interface 222 is illustrated in FIG. 2c as line 240 for a 15% reflectivity of coating 210.

Therefore, when beams $B_2$ and $B_3$ meet at splitter interface 222, there is a resulting phase difference of, $$\Delta\Phi = \frac{4\pi\Delta L}{\lambda} + 2\tan^{-1}\left[\frac{1-\sqrt{R}}{1+\sqrt{R}}\tan\left(\frac{2\pi\eta d}{\lambda}\right)\right]$$

where the optical path difference $\Delta L$ is the difference between the distance $L_1$ and $L_2$ (i.e., $L_1-L_2$).

The phase graphs illustrated in FIG. 2c result when MGTI 200 is designed such that the optical path difference, $\Delta L$, is one half, or multiples of one half, the GT air gap, d. As described, GT etalon 220 perturbs the linear phase ramp of the interferometer 200 and produces a non-linear phase ramp. When the optical path difference, $\Delta L$, is one half, or multiples of one half, the GT air gap, d, this non-linear phase ramp generates a flat top response function that is desired in telecommunication systems. For the case that $\Delta L$ is one half the GT air gap, the phase difference between beam $B_2$ and $B_3$ when they meet at splitter interface 222 is, $$\Delta\Phi = \frac{2\pi d}{\lambda} + 2\tan^{-1}\left[\frac{1-\sqrt{R}}{1+\sqrt{R}}\tan\left(\frac{2\pi\eta d}{\lambda}\right)\right]$$

When beams $B_2$ and $B_3$ meet at the splitter interface, part of beam $B_2$ is reflected, while part of beam $B_3$ is passed through, thereby forming beam $B_4$. Referring to FIG. 2c, at the frequencies where these two portions are substantially 180° (i.e. $\pi$) out of phase, destructive interference occurs, while constructive interference occurs at the frequencies where these two portions are substantially in phase. The interference between these portions of beams $B_2$ and $B_3$ result in beam $B_4$ having a standard intensity pattern of, $$I_{(t)} = I_o \sin^2\left(\frac{\Delta\Phi}{2}\right)$$

This spectral response is illustrated in FIG. 2b as line 230. This spectral response results in beam $B_4$ carrying a first sub-set of channels (e.g., the even channels).

Also, when beams $B_2$ and $B_3$ meet at splitter interface 222, part of beam $B_3$ is reflected with a phase change of $\pi$, while part of beam $B_2$ is passed therethrough, thereby forming beam $B_5$. Because the portion of $B_3$ that forms $B_5$ is reflected with a phase change of $\pi$ (i.e. 180°), the phase ramps for the portions of $B_1$ and $B_2$ that form $B_5$ are similar to that shown in FIG. 2c, except phase ramp 242 is shifted by $\pi$. This changes the frequencies where the portions of $B_3$ and $B_2$ that form $B_5$ are in phase and where they are out of phase. The interference between these portions of beams $B_2$ and $B_3$ results in beam $B_5$ having a standard intensity pattern of, $$I_{(r)} = I_o \cos^2\left(\frac{\Delta\Phi}{2}\right)$$

This spectral response is illustrated in FIG. 2b as line 232. This results in beam $B_5$ carrying a second sub-set of channels (e.g., the odd).

Generally, the shape of the spectral responses of MGTI 200 is determined by the reflectivity of reflective coating 210, while the period between transmission peaks, i.e. the interleaver free spectral range ($FSR_{int}$), of the spectral response is determined by the gap distance d of GT etalon 220. The $FSR_{int}$ is equal to $c/(2\eta d \cos(\theta))$, where c is the velocity of light (e.g. 299792458 m/s), $\eta$ is the refractive index of the cavity (e.g. $\eta_{air}=1.000273$), and $\theta$ is the angle of incidence (e.g. 0°). Therefore, to provide an interleaver operable on systems having, for example, 50 GHz channel spacing, the gap distance of GT etalon 220 is adjusted to provide an $FSR_{int}$ of 50 GHz, i.e. d=2997.1 $\mu$m.

Another type of interleaver (herein after referred to a "SEI") is disclosed in U.S. Pat. No. 6,125,220 issued Sep. 26, 2000 to Copner et al, and U.S. Pat. No. 6,281,977 issued Aug. 28, 2001 in the name of J D S Fitel, which are both incorporated herein by reference. The disclosed interleaver combines the reflected and transmitted fields from a single etalon to provide interleaver/de-interleaver functions.

Presently, systems exists at 50 GHz channel spacing but this channel spacing is likely to decrease with time, resulting in a need for interleavers operable for systems at 25 GHz channel spacing in the near future. This requirement puts extremely tight constraints on the interleaver spectral pass shape. Although prior art MGTI systems produce useful spectra, the interleaving and deinterleaving capabilities may not be sufficient for 25 GHz, or lower, systems. Furthermore, the prior art systems fail to provide for an interferometer that has relatively low dispersion and capable of interleaving and deinterleaving 25 GHz, or lower, systems. Therefore, whatever the precise merits, features and advantages of the above described prior art systems, none of them achieve or fulfills the purposes of the present invention.

SUMMARY OF THE INVENTION

The present invention provides for an interferometer comprising a beamsplitter and two optical resonators, e.g. GT etalons or ring resonators. The beamsplitter splits an input beam of light into a first sub-beam directed to follow a first path and a second sub-beam directed to follow a second path. The first resonator has a first effective cavity length and receives the first sub-beam. The second resonator has a second effective cavity length and receives the second sub-beam. The first path and the second path have an effective optical path difference approximately equal to one-half the first effective cavity length.

In one embodiment, the reflectivities of the front plates of the GT etalons are different, and are selected to provide a desired spectral response. In the preferred embodiment, the ratio of the reflectivities of the front plates should range from between 8:1 to 30:1. Some examples of reflectivities include: 45% and 4.5%, 35% and 2.5%, etc. Furthermore, the higher front reflectivity is selected from between 10%–90%, and more preferably between 25%–60%. Additionally, the lower reflectivity plate varies from 1% to 10%.

In another embodiment, the two resonators are slightly de-phased from one another such that the dispersion slope of the first resonator is oppositely aligned, and preferably equal, with the dispersion slope of the second etalon, so that the overall dispersion of the device is greatly reduced.

Another aspect of the present invention relates to an interferometer with a predetermined free spectral range (FSR) comprising:

a polarization dependent delay section to produce an effective optical path difference of approximately L between orthogonally polarized components of an input beam of light; and a resonator, optically coupled to said polarization dependent delay section, having a cavity length of substantially 2 L;

whereby, when the orthogonally polarized components of the input beam of light are recombined, a series of wavelength channels with a predetermined polarization pattern are formed.

Another aspect of the present invention relates to an interferometer with a predetermined free spectral range (FSR) comprising:

a optical resonator having a first port for launching an input beam of light, a second port for outputting reflected light from the resonator, a third port for outputting transmitted light from the resonator, and an effective cavity length; and first coupling means for combining the reflected and transmitted light from the optical resonator, wherein the reflected and transmitted light have a first effective optical path length difference between the optical resonator and the first coupling means of approximately half the effective cavity length.

Preferably, the aforementioned interferometer further comprises second coupling means for combining the reflected and transmitted light from the optical resonator, wherein the reflected light and the transmitted light have a second effective optical path length difference between the of approximately $+/-n(\lambda_c/4)$ or $+/-n(FSR/2)$, wherein $\lambda_c$ is the center wavelength of the input beam of light, and n is an integer.

BRIEF DESCRIPTION OF THE DRAWINGS

FIG. 1 conceptually illustrates the function of an interleaver;

FIGS. 2b and 2c illustrate the spectral response and phase ramps, respectively, of an MGTI;

FIGS. 3b and 3c illustrate the spectral response and phase ramps, respectively, of one embodiment of the present invention for reflectivities of R1=45% and R2=4.5%;

FIG. 5b illustrates how the dispersion profiles from the two GT's of FIG. 5a align;

FIG. 6a illustrates a top view of a polarization-based implementation of the embodiment of FIG. 5a;

FIG. 6b illustrates a side view of the polarization-based implementation of the embodiment of FIG. 6a;

FIGS. 6c and 6d illustrate alternate embodiments of the phase delay section of the polarization-based implementation of the embodiment of FIG. 6a;

FIG. 10a illustrates an embodiment to further reduce the chromatic dispersion in the embodiment of FIG. 5a;

FIG. 10b illustrates exemplary dispersion profiles for the cascaded interferometer of FIG. 10a;

FIG. 10c illustrates an exemplary resultant dispersion profile of the embodiment of FIG. 10a;

FIGS. 10d and 10e, collectively, conceptually illustrate the resulting spectral response of the embodiment of FIG. 10a;

FIG. 11a conceptually illustrates another embodiment to further reduce the chromatic dispersion in the embodiment of FIG. 5a;

FIG. 12b illustrates a solid version of the multi-cavity etalon embodiment of FIG. 12a;

FIGS. 12c and 12d illustrate spectral responses and chromatic dispersion profiles, respectively, for the embodiment of FIG. 12a;

DETAILED DESCRIPTION

Figure 2A:
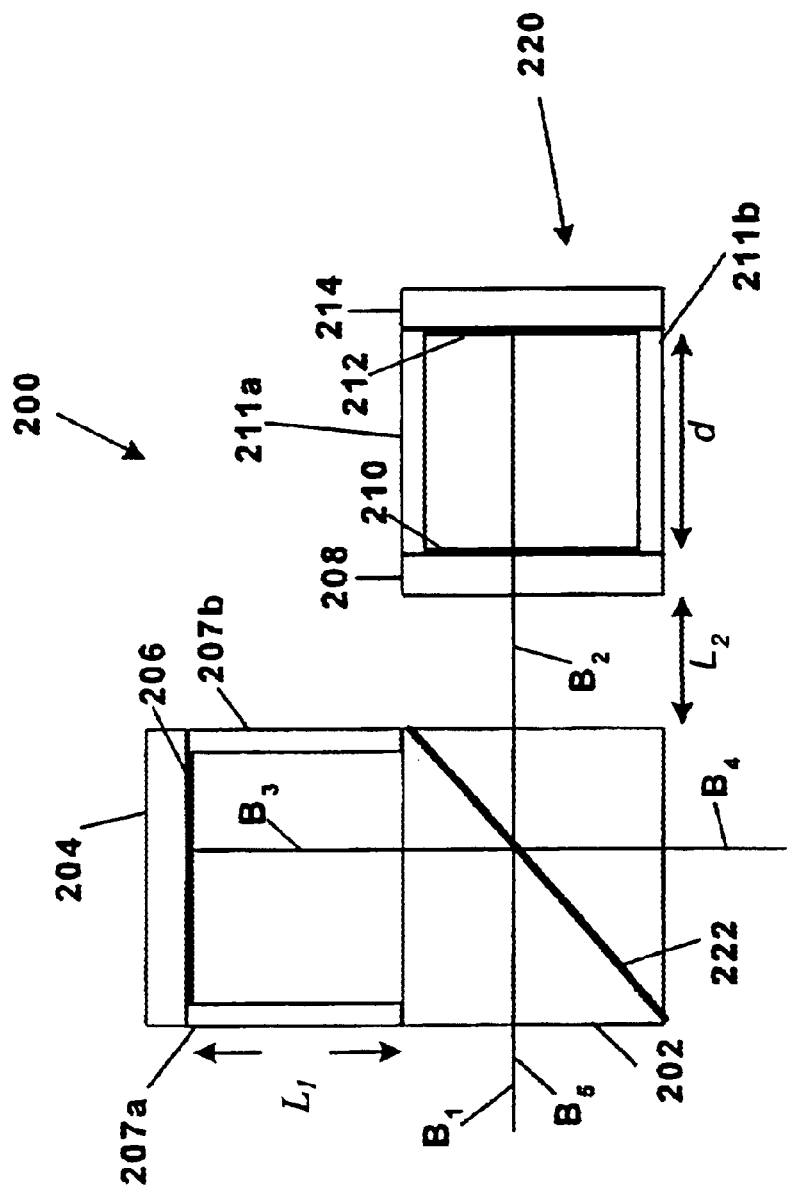
FIG. 2a illustrates a standard Michelson interferometer with one mirror replaced with a Gires Tournois etalon (an MGTI) used as an interleaver.

While this invention is illustrated and described in one or more preferred embodiments, the invention may be produced in many different configurations, forms and materials. There is depicted in the drawings, and will herein be described in detail, one or more preferred embodiments of the invention, with the understanding that the present disclosure is to be considered as an exemplification of the principles of the invention and the associated functional specifications for its construction and is not intended to limit the invention to the embodiment or embodiments illustrated. Those skilled in the art will envision many other possible variations within the scope of the present invention.

Figure 3A:
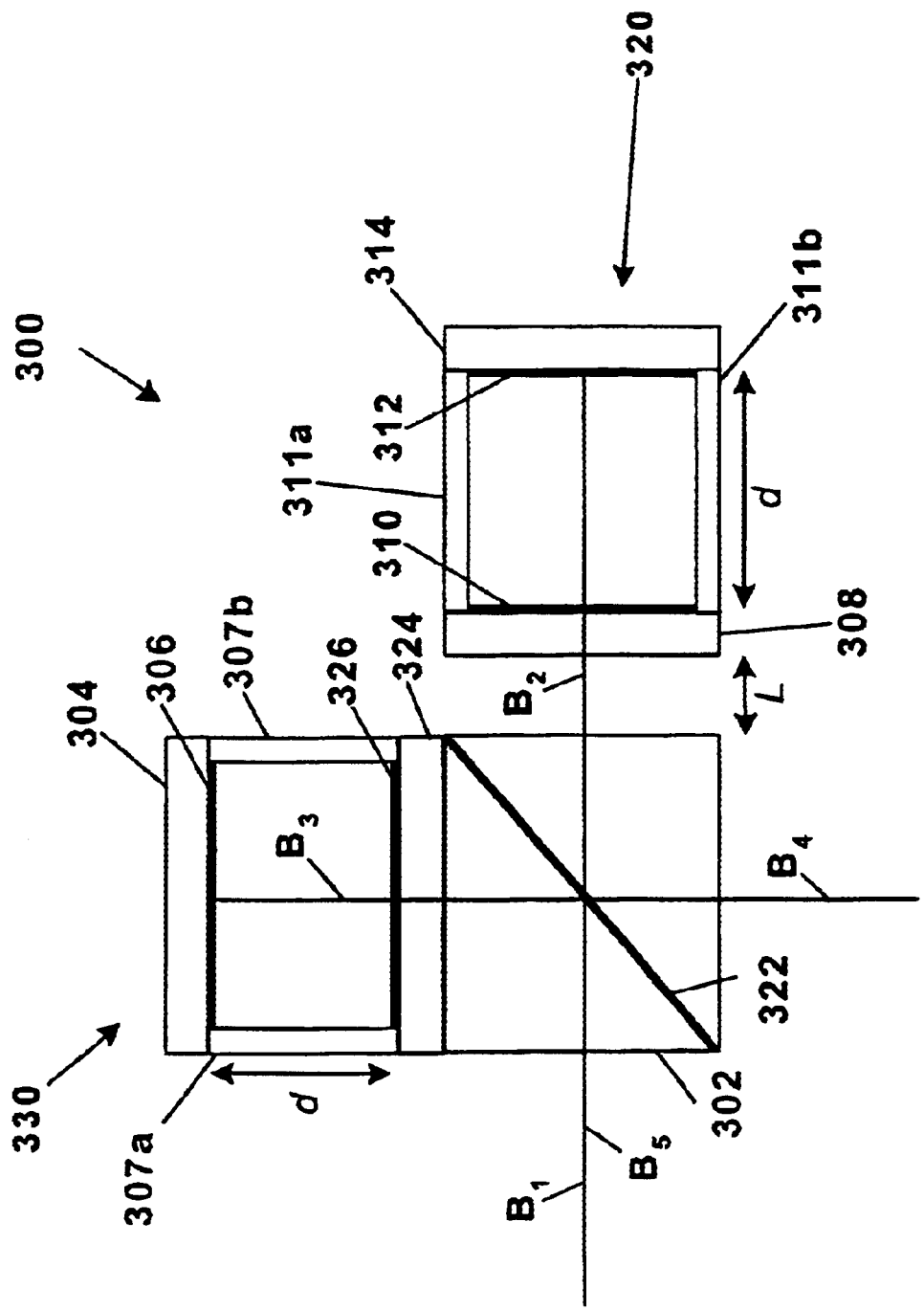
FIG. 3a illustrates an interferometer according to the principles of the present invention.

FIG. 3a illustrates an interferometer 300 according to the principles of the present invention. Generally, interferometer 300 comprises two Gires-Tournois (GT) etalons in a Michelson interferometer configuration. As shown, interferometer 300 comprises a beam splitter 302 (preferably an approximately 50/50 splitter), a first GT etalon 320 placed in one arm and a second GT etalon 330 placed in the other arm. First GT etalon 320 comprises: a front plate 308, with a partially reflective coating 310 with reflectivity R1; spacers 311a and 311b, preferably made from ultra low expansion material (ULE); and a back plate 314, with a highly reflective (near 100%) coating 312. As shown, a cavity length of distance d separates front plate 308 and back plate 314 of first GT etalon 320. Second GT etalon 330 is similar to first GT etalon 320 and comprises: a front plate 324, with a partially reflective coating 326 with reflectivity R2; spacers 307a and 307b, preferably made from ultra low expansion material (ULE); and a back plate 304, with a highly reflective (near 100%) coating 306. Second GT etalon also has a cavity length of distance d separating front plate 324 from back plate 304.

Further, an effective optical path difference between the two arms is introduced. In the preferred embodiment, this effective optical path difference is introduced by placing first GT etalon 320 a distance L from beam splitter 302 while placing GT etalon 330 adjacent beam splitter 302. As would be apparent to one of skill in the art, however, an effective optical path difference could alternatively be introduced by placing GT etalons 320 and 330 at different distances away from beam splitter 302 (similar to that illustrated for MGTI 200 above). It is preferred that the optical path difference L is equal to one-half the gap distance d, i.e. d=2 L The interferometer of the present invention is similar to an MGTI, but with the mirror replaced with another GT etalon. As discussed above, in an MGTI the phase of the reflected E-field from the GT etalon is subtracted from the phase change induced from the optical path difference generated by the fixed 100% mirror. In the present invention, the phase between the reflected E-fields from the two GT etalons 320 and 330 is compared (i.e. subtracted).

In one embodiment of the present invention, the input reflectance of each GT etalon is varied so as to achieve a custom spectral plot. In this embodiment, the reflectivity of each of the coatings 310 and 326 of front plates 308 and 324 of GT etalons 320 and 330 are different and selected to provide a desired spectral response. In the preferred embodiment, the ratio of the reflectivity's of the front plates ranges from between 8:1 to 30:1, e.g. 45% and 5%, 35% and 2.5%, etc. Furthermore, the higher reflectivity R1 is selected from between 10%–90%, and more preferably between 25%–60%. Additionally, the lower reflectivity R2 varies from 1% to 10%. It is also preferred that coating 310 in the arm with the optical path difference of L have the higher front reflectivity.

Similar to an MGTI, interferometer 300 acts to deinterleave channels when a beam $B_1$ carrying a set of channels, for example ITU even and odd channels, is input. The spectral response of beam $B_4$ results in beam $B_4$ carrying a first sub-set of channels, for example, even ITU channels, while the spectral response of beam $B_5$ results in beam $B_5$ carrying a second sub-set of channels, for example, odd ITU channels. In a similar fashion, interferometer 300 acts to interleave channels when both beam $B_4$ carrying a first sub-set of channels (e.g., even ITU channels) and beam $B_5$ carrying a second sub-set of channels (e.g. odd ITU channels) are input to interleaver 300. In this case beam $B_1$ is output carrying the set of channels (e.g., the even and odd ITU channels).

As illustrated in FIG. 3a, an incident beam $B_1$ directed towards beam splitter 302 is split at splitter interface 322 into a beam $B_3$ and beam $B_2$. Beam $B_3$ is directed towards GT etalon 330, while beam $B_2$ is directed towards GT etalon 320. Both beams $B_3$ and $B_2$ are reflected back to splitter 302. Beam $B_2$ experiences a non-linear phase change from GT etalon 320 in addition to a phase change from optical path difference L. At splitter interface 322, the phase change of beam $B_2$ is, $$\Phi = \frac{4\pi L}{\lambda} - 2\tan^{-1}\left[\frac{1-\sqrt{R_1}}{1+\sqrt{R_1}}\tan\left(\frac{2\pi\eta d}{\lambda}\right)\right] + \beta,$$

where β represents the phase change resulting from the distance beam $B_2$ travels through beam splitter 302 from interface 322 to GT etalon 320 and back. An exemplary phase ramp of beam $B_2$ at splitter interface 322 is illustrated in FIG. 3c as line 342 for a 45% reflectivity of coating 310.

Similarly, beam $B_3$ also experiences a non-linear phase change from GT etalon 330. At splitter interface 322, this phase change is, $$\Phi = -2\tan^{-1}\left[\frac{1-\sqrt{R_2}}{1+\sqrt{R_2}}\tan\left(\frac{2\pi\eta d}{\lambda}\right)\right] + \beta,$$

where β represents the phase change from the distance beam $B_3$ travels through beam splitter 302 from interface 322 to GT etalon 330 and back. Because beam splitter 302 is a cube, the distance beam $B_3$ travels through beam splitter 302 from interface 322 to GT etalon 330 and back is the same distance as beam $B_2$. Therefore, the phase change resulting from traveling this distance, β, is the same as that for beam $B_2$. An exemplary phase ramp of beam $B_2$ at splitter interface 320 is illustrated in FIG. 3c as line 340 for a 4.5% reflectivity of coating 326.

Therefore, at splitter interface 322 there is a resulting phase difference between $B_3$ and $B_2$ of, $$\Delta\Phi = -2\tan^{-1}\left[\frac{1-\sqrt{R_2}}{1+\sqrt{R_2}}\tan\left(\frac{2\pi\eta d}{\lambda}\right)\right] - \frac{4\pi L}{\lambda} + 2\tan^{-1}\left[\frac{1-\sqrt{R_1}}{1+\sqrt{R_1}}\tan\left(\frac{2\pi\eta d}{\lambda}\right)\right].$$

When beams $B_2$ and $B_3$ meet at the splitter interface, part of beam $B_2$ is reflected, while part of beam $B_3$ is passed through, thereby forming beam $B_4$. Referring to FIG. 3c, at the frequencies where these two portions are substantially 180° (i.e. π) out of phase, destructive interference occurs, while constructive interference occurs at the frequencies where these two portions are substantially in phase. The interference between these portions of beams $B_2$ and $B_3$ result in beam $B_4$ having a standard intensity pattern of, $$I_{(t)} = I_o \sin^2\left(\frac{\Delta\Phi}{2}\right)$$

This spectral response is illustrated in FIG. 3b as line 332. When beam $B_1$ comprises a set of channels ($f_2$, $f_3$, $f_4$, $f_5$ and $f_6$ as illustrated), this spectral response results in beam B4 carrying a first sub-set of the channels, i.e. $f_2$, $f_4$ and $f_6$, which, for example, correspond to even ITU channels.

Also, when beams $B_2$ and $B_3$ meet at splitter interface 322, part of beam $B_3$ is reflected with a phase change of π, while part of beam $B_2$ is passed therethrough, thereby forming beam $B_5$. Because the portion of $B_3$ that forms $B_5$ is reflected with a phase change of π (i.e. 180°), the phase ramps for the portions of $B_1$ and $B_2$ that form $B_5$ are similar to that shown in FIG. 3c, except phase ramp 342 is shifted by π. This changes the frequencies where the portions of $B_3$ and $B_2$ that form $B_5$ are in phase and where they are out of phase. The interference between these portions of beams $B_2$ and $B_3$ results in beam $B_5$ having a standard intensity pattern of, $$I_{(t)} = I_o \cos^2\left(\frac{\Delta\Phi}{2}\right)$$

This spectral response is illustrated in FIG. 3b as line 334. When beam $B_1$ comprises a set of channels ($f_2$, $f_3$, $f_4$, $f_5$ and $f_6$ as illustrated), this spectral response results in beam $B_5$ carrying a second sub-set of channels, i.e. $f_3$ and $f_5$, which, for example, correspond to odd ITU channels.

Figure 4:
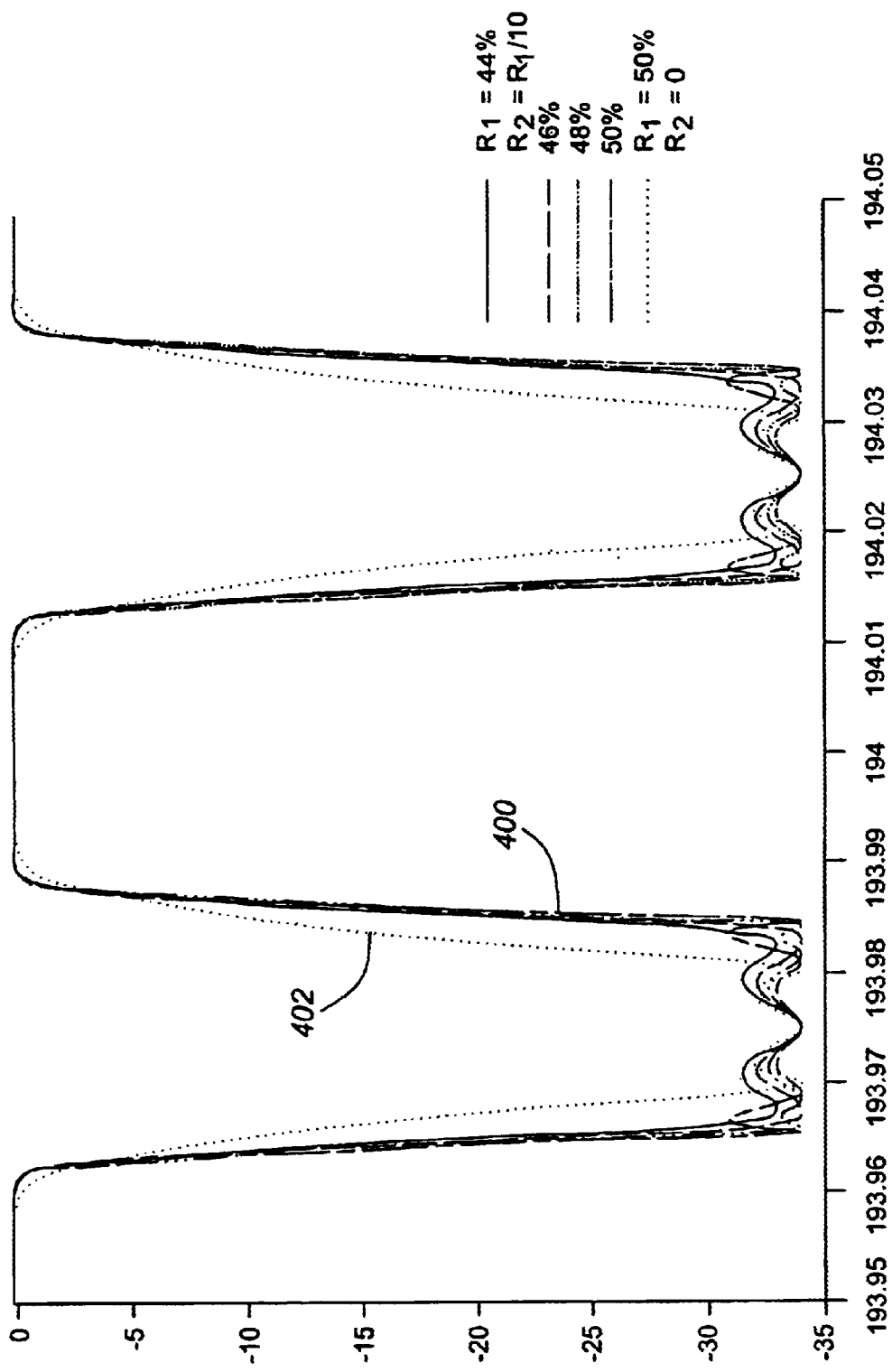
FIG. 4 illustrates spectral responses of one embodiment of the present invention for a reflectivity ratio of 10:1 for a number of R1 reflectivities between 44–50% and the spectral response of an MGTI.

Similar to an MGTI, the shape of the spectral responses of interferometer 300 is determined by the reflectivity of coatings 310 and 326. However, when compared to an MGTI, the phases of each beam are more closely matched in each passband. Furthermore, when compared to an MGTI, the phase difference between each beam is closer to π during each stop-band. This results in a spectral response, which has a wider pass band and steeper roll-off at the band edge when compared to an MGTI with equivalent $FSR_{int}$. This is shown in FIG. 4. In FIG. 4, lines 400 represent spectral responses for the present invention with a reflectivity ratio of 10:1 for a number of RI reflectivities between 44–50%. Line 402 represents the spectral response for an MGTI with a GT etalon having a front reflectivity of 15%.

Also similar to an MGTI, the period between transmission peaks, i.e. the $FSR_{int}$, of the spectral response is determined by the gap distance d of GT etalons 320 and 330, according to the aforementioned equation: $FSR_{int}=c/(2\eta d \cos(\theta))$. Therefore, to provide an interleaver operable on systems having, for example, 25 GHz channel spacing, the gap distance d of GT etalons 320 and 330 is adjusted to provide an $FSR_{int}$ of 25 GHz, i.e. d=5994.2 microns.

Figure 5A:
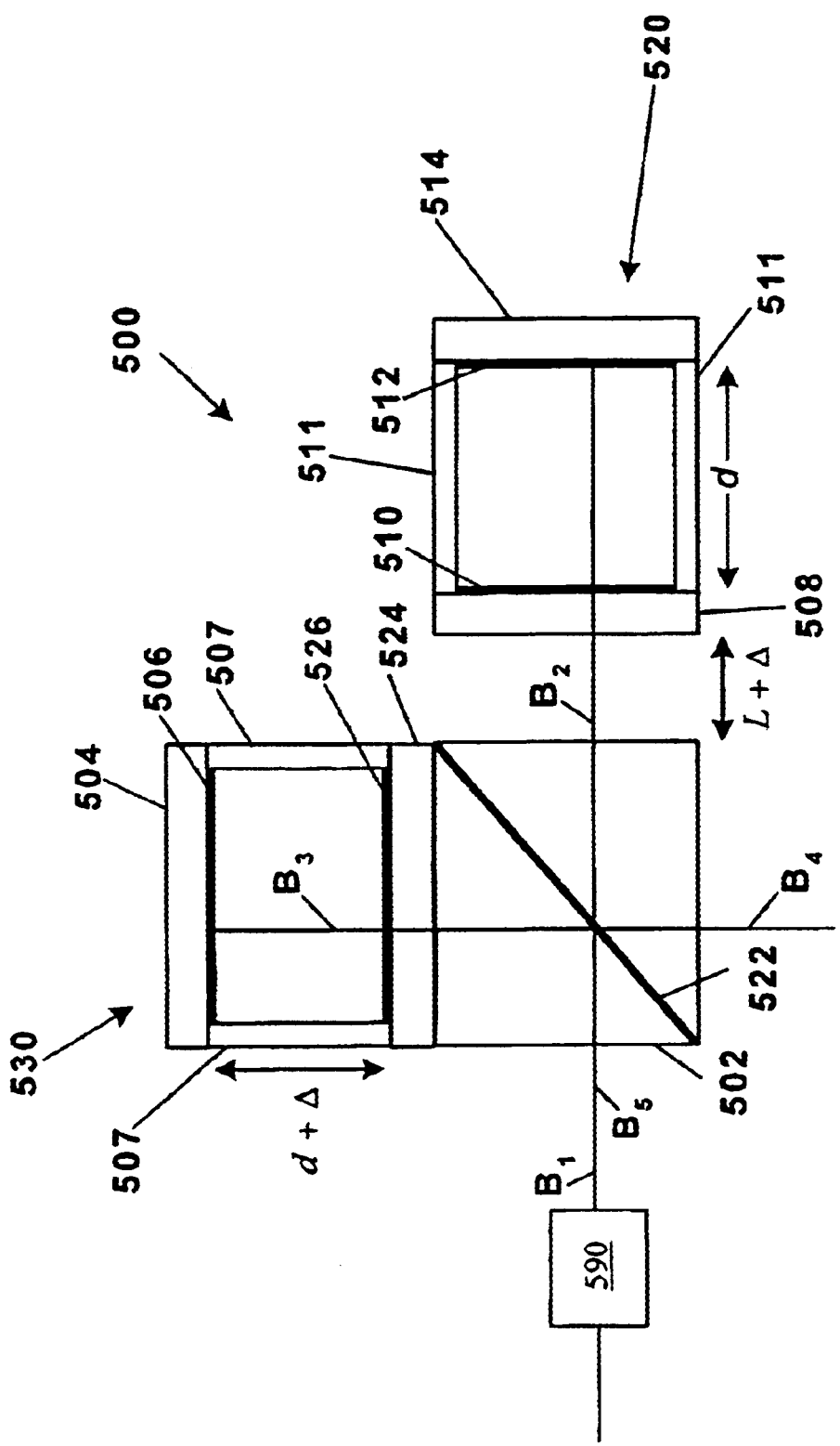
FIG. 5a illustrates another embodiment of an interferometer according to the principles of the present invention in which the two etalons are slightly de-phased from one another so as to reduce chromatic dispersion.

FIG. 5a illustrates another embodiment of an interferometer 500 according to the principles of the present invention in which the two etalons are slightly de-phased from one another so as to reduce chromatic dispersion. As shown, interferometer 500 is similar to interferometer 300, i.e. two almost identical GT etalons, 520 and 530, (with cavity length of d) are initially placed on adjacent sides of a beamsplitter 502, in a Michelson interferometer configuration with an effective optical path difference of a length L between them. The length of the effective optical path difference is preferably equal to one-half the cavity length d of the GT etalons 530 and 520, i.e. d=2 L. The etalon 530 includes a front plate 524 with a partially reflective coating 526, and a back plate 504 with an almost fully reflective coating 506. The front and back plates 524 and 504, respectively, are separated by spacers 507, which are preferably made from a ULE material. Similarly, etalon 520 includes a back plate 514 with a reflective coating 512, and a front plate 508 with a reflective coating 510. The two plates 514 and 508 are held apart by ULE spaces 511.

Like interferometer 300, interferometer 500 acts to deinterleave channels when a beam $B_1$ comprising a set of channels, for example, ITU even and odd channels is input. The spectral response of beam $B_4$ results in beam $B_4$ carrying a first sub-set of channels, for example, even ITU channels, while the spectral response of beam $B_5$ results in beam $B_5$ carrying a second sub-set of channels, for example, odd ITU channels. In a similar fashion, interferometer 500 acts to interleave channels when both beam $B_4$ carrying a first sub-set of channels (e.g., even ITU channels) and beam $B_5$ carrying a second sub-set of channels (e.g. odd ITU channels) are input to interferometer 500. In this case beam $B_1$ is output carrying the set of channels (e.g., the even and odd ITU channels).

However, in the interferometer 500, the GT etalons 530 and 520 are slightly de-phased from one another such that the positive dispersion slope of one is aligned with the negative dispersion slope of the other. This is preferably achieved by changing the effective cavity length of one of the GT etalons by a length Δ to shift the resonance peak of the GT etalon. Preferably, the effective resonance peak is shifted by ½ (or an odd multiple thereof) of the etalon free spectral range ($FSR_{GT}$) in order to achieve minimal dispersion. This corresponds to approximately a λ/4 shift in the cavity length, i.e. ±1550 nm/4=±387.5 nm or ±0.3875 μm.

As is evident to one skilled in the art, shifting the effective resonance peak to various other positions in which the positive dispersion slope of one etalon is aligned with the negative dispersion slope of the other, e.g. by 3λ/4, will still have beneficial results; however, the net optical path will not be optimal and a wavelength dependent isolation will be observed.

One method of changing the effective cavity length of one of the GT etalons is by physically changing the cavity length of the GT etalon by the length Δ. This is illustrated in FIG. 5a by GT etalon 530 having a physical cavity length of d+Δ. It will be appreciated by one of skill in the art, however, that there are other possible methods of changing the effective cavity length of one of the GT etalons.

FIG. 5b illustrates how the dispersion profiles from GT etalons 520 and 530 align when there is an approximately a λ/4 shift in the cavity length of GT etalon 530. Line 540 is the dispersion profile resulting from GT etalon 530, while line 542 is the dispersion profile resulting from GT etalon 520. The resulting, minimal dispersion profile per wavelength is shown as line 544. As can be seen, the resulting effective dispersion appears to mimic the average dispersion and under these circumstances the overall dispersion is reduced.

In addition to changing the effective cavity length of one of the GT etalons, it is also necessary to adjust the effective optical path difference by the length Δ, in order to acquire an optimal phase response, i.e. the effective optical path difference becomes L+Δ. Therefore, in the preferred embodiment in which there is an approximately λ/4 shift in the effective cavity length (d±λ/4), the shift from L to acquire the optimal phase response is λ/4. As such, the preferable length of the effective optical path difference is shifted from L to L±λ/4. Please note, if Δ is a positive shift in length d, then it will be a positive shift in length L. The same is true for a negative shift.

When the effective optical path difference or effective cavity length is varied, the level of dispersion oscillates from a low dispersion where there is an interleaved output to a high dispersion where the interleaver output is destroyed. This occurs as the two dispersion slopes from GT etalons 520 and 530 are effectively added or subtracted depending on the optical phase difference. Thus, by providing interferometer 500 with a variable effective cavity length of etalon 530 and variable effective optical path difference, a tunable dispersion compensator is provided.

It is preferable that GT etalons 520 and 530 are weak, i.e. <10%, and more preferably <5%, so that the effective dispersion averaging (cancellation) is achieved over an extended wavelength. For the dispersion profiles illustrated in FIG. 5b, the reflectivities of coatings 526 and 510 are approximately 2%, but higher or lower reflectivies can be used. Also, GT etalons 520 and 530 can have different reflectivities of coatings 526 and 510, e.g. coating 526 with a reflectivity eof 2% and coating 510 with a reflectivity of 4%. However, it has been observed that for optimal performance relating to the isolation levels, the higher reflector should be on the side of the extra optical path, L. It should be noted that if much higher, i.e. >15%, reflectivities are used, it becomes difficult to eliminate the non-linear dispersion effects of GT etalons 520 and 530.

Typical values obtainable for the embodiment of FIG. 5a with a reflectivity of 2.2% for coatings 526 and 510 are as follows:

|  | 50 GHz Channel Spacing | 25 GHz Channel Spacing |
| --- | --- | --- |
| MAX. DISPERSION | +/−30 ps/nm | +/−120 ps/nm |
| BANDWIDTH @ 1 dB | 40.6 GHz | 20.2 GHz |
| CROSSTALK | >25 dB | >22 dB |

Figure 5C:
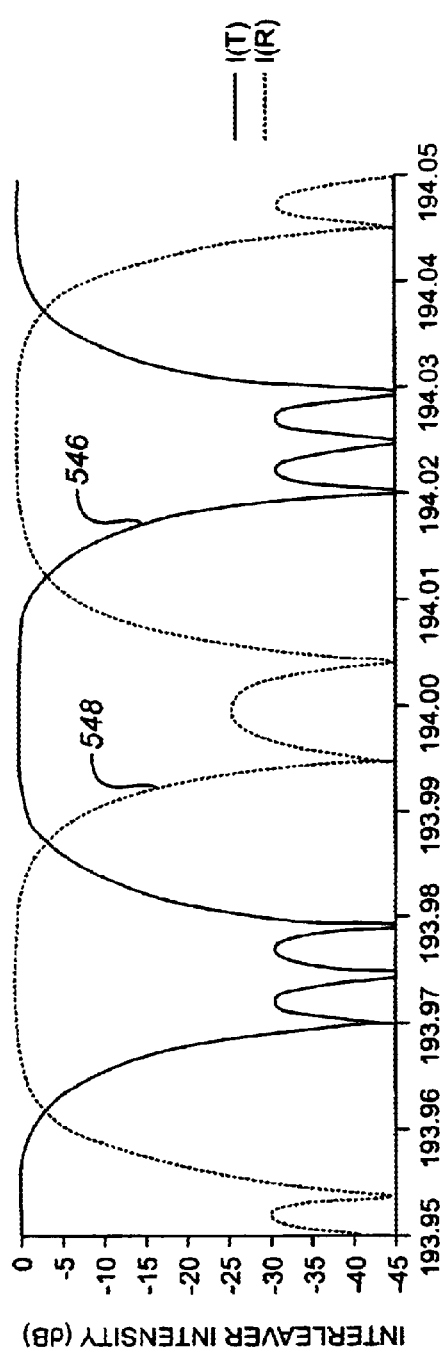
FIG. 5c illustrates an example spectral intensity profile of the embodiment of FIG. 5a designed as a 25 GHz interleaver.
Figure 5D:
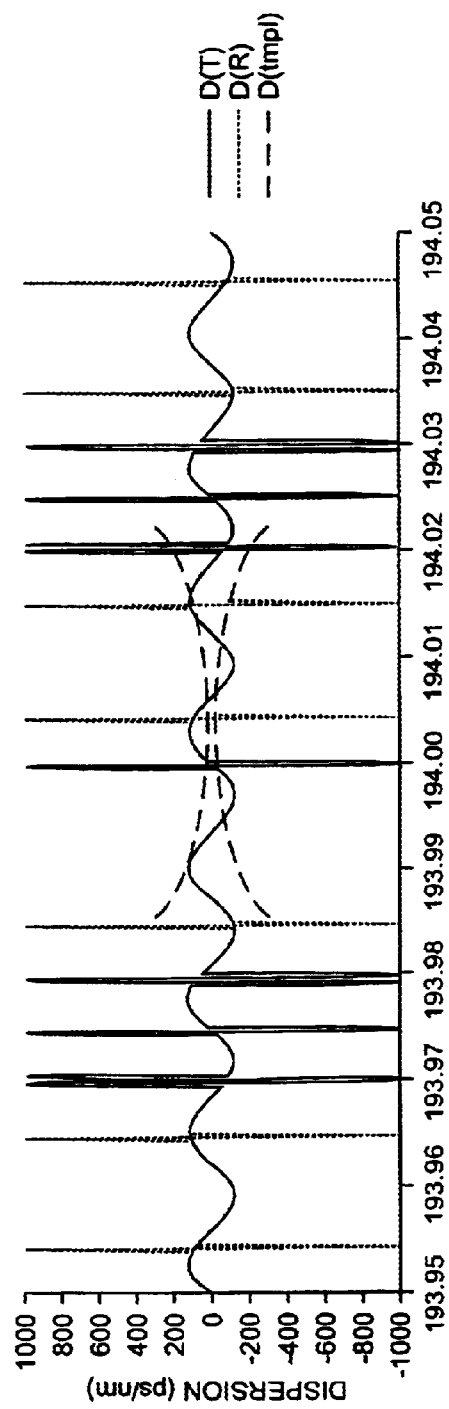
FIG. 5d illustrates an example dispersion profile of the embodiment of FIG. 5a designed as a 25 GHz interleaver.

Illustrated in FIG. 5c is an exemplary spectral response for interferometer 500 designed as a 25 GHz interleaver with a reflectivity of 99.7% for coatings 506 and 512, and a reflectivity of 2.5% for coatings 510 and 526. Line 546 illustrates the spectral response for beam B4, while line 548 illustrates the spectral response for beam $B_5$. The effective optical path difference is L+λ/4; however, some re-phasing of the effective optical path difference may be able to further optimize this profile. FIG. 5d illustrates the resulting dispersion profile per wavelength for the interleaver designed as a 25 GHz interleaver. As can be seen from FIG. 5d, the overall dispersion magnitude for the interleaver according to the present invention is effectively reduced by a factor of 7 to 10, as compared to the conventional 25 GHz interleaver.

FIGS. 6a to 6d illustrate polarization-based implementations of the present invention. As shown, interferometer 600 comprises a polarization dependent delay section 609 and a modified GT etalon 610 with a physical cavity length d.

Interferometer 600 acts to deinterleave channels when an optical beam 601 comprising a set of channels, for example, ITU even and odd channels is input via a port 602. The optical beam 601 can be launched linearly polarized or, as in the illustrated embodiment, be split into two orthogonally polarized optical beams 601a and 601b (not shown) by a walk-off crystal 603, one of which passes through a half wave plate 604, thereby forming two like-polarized sub-beams. The like polarized sub-beams 601a and 601b pass directly through a first polarization beam splitter (PBS) 605, a non-reciprocal rotator 606, and a second polarization beam splitter 607 without being affected. A quarter wave plate 608 rotates the polarization of both sub-beams 601a and 601b by 45° before entry into the delay section 609. The non-reciprocal rotator 606 is preferably comprised by a Faraday rotator and a quarter wave plate, which are designed to rotate the polarization of beams traveling in one direction by 90°, while having no cumulative effect on the polarization of beams traveling in the opposite direction.

The delay section 609 introduces an effective optical path difference between the s and p components in each of the sub-beams 601a and 601b, similar to the effective optical path difference introduced in interleaver 500. Delay section 609 is preferably made from two birefringent crystals 611 and 612 whose materials (e.g. $TiO_2$ crystals and $YVO_4$ crystals) are chosen to improve the thermal stability of delay section 609 over a selected temperature range. It is within the spirit of the present invention, however, to use a single birefringent crystal, or more than two crystals whose materials are chosen to make delay section 609 temperature insensitive. Because delay section 609 is made from birefringent material, when two linearly polarized optical beams that have different planes of polarization pass therethrough, one of the beams travels at a faster velocity than the other. Therefore, the s and p components of the optical beams 601a and 601b experience an effective optical path difference when they pass through delay section 609. By appropriately choosing the materials of the birefringent crystals 611 and 612 and length of delay section 609, the effective optical path difference is preferably designed to be approximately L+Δ, where L is equal to one-half the cavity length d. The length of the delay section 609 may additionally be made variable so as to provide for an adjustable effective optical path difference.

The modified GT etalon 610 comprises a front plate 615 with a partially reflective (e.g. 2%) coating 616, spacers 617a and 617b (preferably made from ultra low expansion material (ULE)), a quarter waveplate 618, and a back plate 619 with a highly reflective (near 100%) coating 620.

When the two sub-beams 601a and 601b traverse the cavity of modified GT etalon 610, they pass through waveplate 618 before being reflected back by highly reflective coating 620. A waveplate causes two linearly polarized optical beams that have different planes of polarization to experience an effective optical path difference when they pass through it. This will, therefore, cause the operation of GT etalon 610 on the s components of the sub-beams 601a and 601b to be slightly de-phased from its operation on the p components by making one of the components experience an effective cavity length (i.e. d) that is different from the effective cavity length (i.e. d±Δ) experienced by the other component, similar to interleaver 500. In effect, waveplate 618 creates two GT etalons, each having a different effective cavity length.

As such, interferometer 600 operates similarly to interferometer 500 by de-phasing the operation of modified GT etalon 610 on the s and p components of the sub-beams 601a and 601b, such that the positive dispersion slope for its operation on the s components is aligned with the negative dispersion slope for its operation on the p components. As described above, the effective resonance peak is preferably shifted by about ½ of the etalon's free spectral range ($FSR_{GT}$) to achieve minimal dispersion. This corresponds to approximately a λ/4 difference between the effective cavity lengths experienced by the s and p components of the sub-beams 601a and 601b. Therefore, waveplate 618 is preferably a quarter-waveplate with its optical axis at 450 to the polarization planes of the sub-beams 601a and 601b. As a result, when the s and p components are recombined they interfere to provide a similar spectral response as above with the added advantage that the one set of channels (e.g. even numbered ITU channels) is orthogonally polarized to the other set of channels (e.g. odd numbered ITU channels). Accordingly, when the sub-beams 601a and 601b pass through the PBS 607, sub-sub-beams 621a and 621b, each containing a part of one set of channels, are reflected toward a walk-off crystal 622. A waveplate 623 rotates the polarization of one of the sub-sub-beams 621a or 621b, so that the two sub-sub-beams can be combined in the walk-off crystal 622 for output lens 624 and waveguide 625. Moreover, sub-sub-beams 626a and 626b pass through the PBS 607, and have their polarizations rotated by 90° in the non-reciprocal rotator 606. Accordingly, the sub-sub-beams 626a and 626b are reflected by the PBS 605 towards a walk-off crystal 627. A waveplate 628 rotates the polarization of one of the sub-sub-beams 626a or 626b, so that the two sub-sub-beams can be combined in the walk-off crystal 627 for output lens 628 and waveguide 629.

Figure 6A:
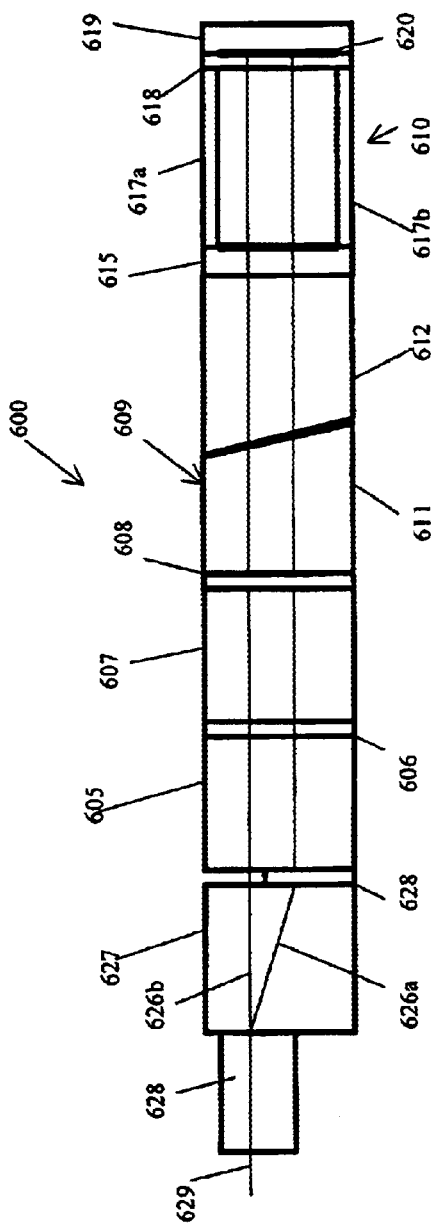
Figure 6C:
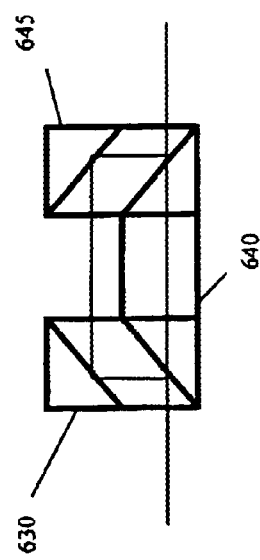
Figure 6B:
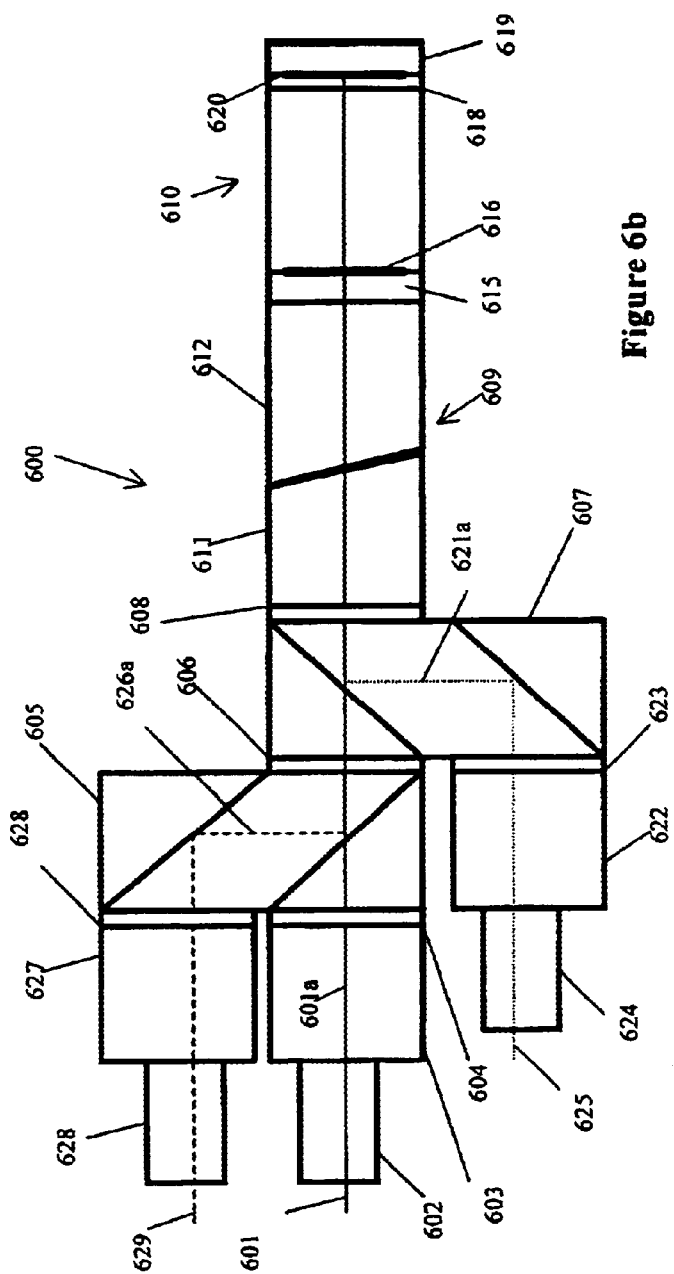
Figure 6D:
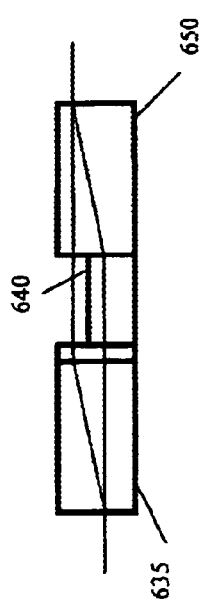

FIGS. 6c and 6d illustrate alternate embodiments of the phase shifting section 609, wherein the beam is physically separated into s and p components by a polarization beam splitter, such as a PBS cube 630 (FIG. 6c) or a walk-off crystal 635 (FIG. 6d). One of the separated sub-beams is passed through a delay section 640, which has an index of refraction that is different than air. Accordingly, when the sub-beams are recombined by a second PBS cube 645 or walk-off crystal 650, a phase shift has been introduced therebetween.

While illustrated with a Michelson interferometer configuration having orthogonal arms and normally incident input beams, alternate configurations and beam injections are possible within the scope and spirit of the present invention. As examples, FIG. 7a illustrates an alternate manner of injecting input optical beam, and FIG. 8 illustrates an alternate configuration.

Figure 7A:
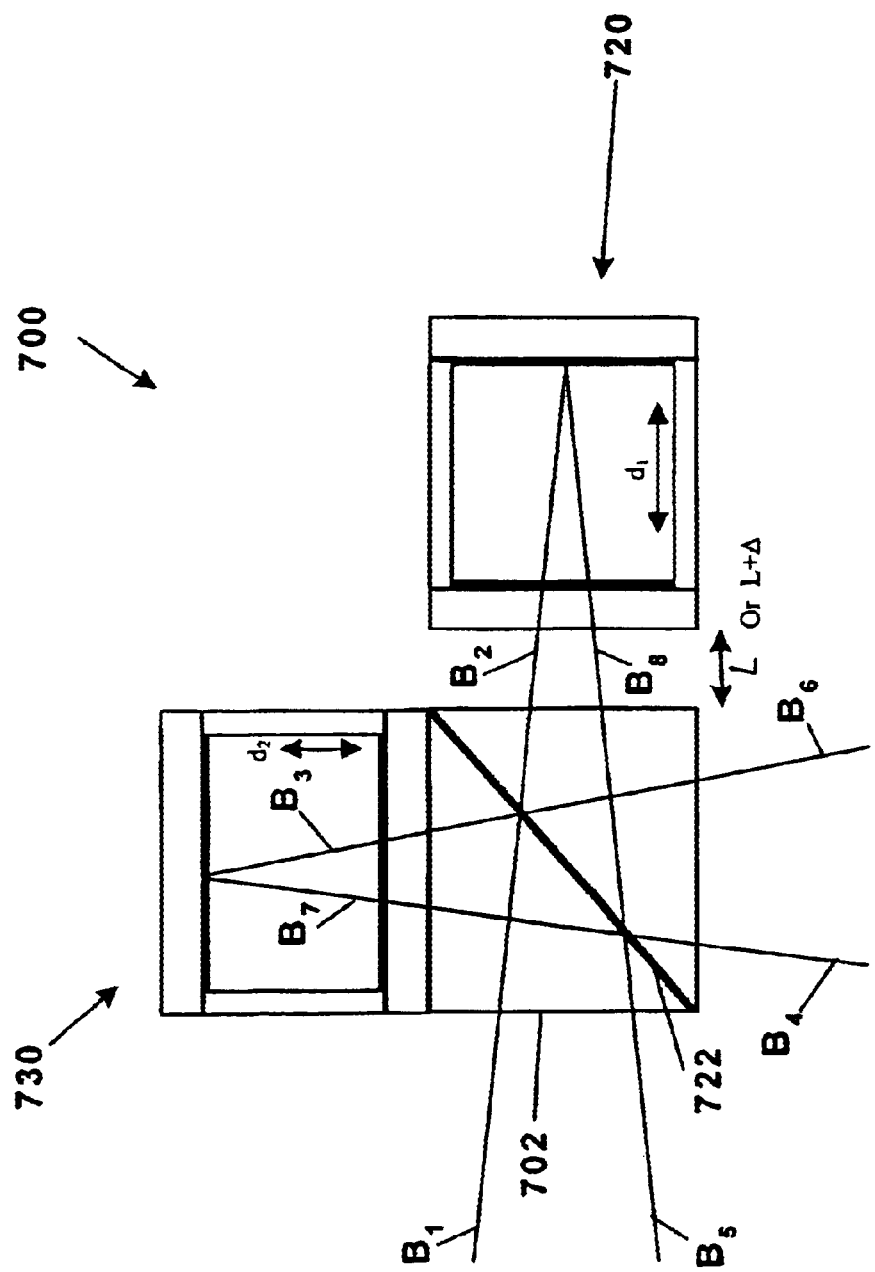
FIG. 7a illustrates an alternate manner of injecting optical beams into the interferometer 300 or interferometer 500.

FIG. 7a illustrates an alternate manner of injecting optical beams that allows for a four-port device. An interferometer 700 is constructed according to the principles of either the interferometer of FIG. 3a or the interferometer of FIG. 5a, i.e. the path difference is either L of L+Δ, and the cavity length of etalon 730 is either 2L or 2L+Δ. As shown, rather than injecting optical beams incident along the normal of beamsplitter 702, optical beams are injected at an angle to the normal. Therefore, when an optical beam is split at beamsplitter interface 722, each of the resulting beams are directed towards their respective GT etalon also at an angle to the normal of the respective GT etalon. This results in the reflected beams intersecting at a point along splitter interface 722 that is different than the point at which the optical beam was split.

For instance, when an optical beam is injected as beam $B_1$ as shown, it is split into a beam $B_3$ directed towards GT etalon 730 at an angle to the normal and a beam $B_2$ directed towards GT etalon 720 at an angle to the normal. When beam $B_3$ and beam $B_2$ are reflected back as beams $B_7$ and $B_8$, respectively, beams $B_7$ and $B_8$ intersect at splitter interface 722 and combine to create beams $B_5$ and $B_4$ as outputs. Likewise, when an optical beam is injected as beam $B_5$, it is split into a beam $B_7$ directed towards GT etalon 730 at an angle to the normal and a beam $B_8$ directed towards GT etalon 720 at an angle to the normal. When beam $B_7$ and beam $B_8$ are reflected back as beams $B_3$ and $B_2$, respectively, beams $B_3$ and $B_2$ intersect at splitter interface 722 and combine to create beams $B_1$ and $B_6$ as outputs.

In a similar manner, an optical beam can be input as either beam $B_4$ and $B_6$. When an optical beam is input as beam $B_4$, it is split into a beam $B_7$ directed towards GT etalon 730 at an angle to the normal and a beam $B_8$ directed towards GT etalon 720 at an angle to the normal. When beam $B_7$ and beam $B_8$ are reflected back as beams $B_3$ and $B_2$, respectively, beams $B_3$ and $B_2$ intersect at splitter interface 722 and combine to create beams $B_1$ and $B_6$ as outputs. When an optical beam is injected as beam $B_6$, it is split into a beam $B_3$ directed towards GT etalon 730 at an angle to the normal and a beam $B_2$ directed towards GT etalon 720 at an angle to the normal. When beam $B_3$ and beam $B_2$ are reflected back as beams $B_7$ and $B_8$, respectively, beams $B_7$ and $B_8$ intersect at splitter interface 722 and combine to create beams $B_5$ and $B_4$ as outputs.

Figure 7B:
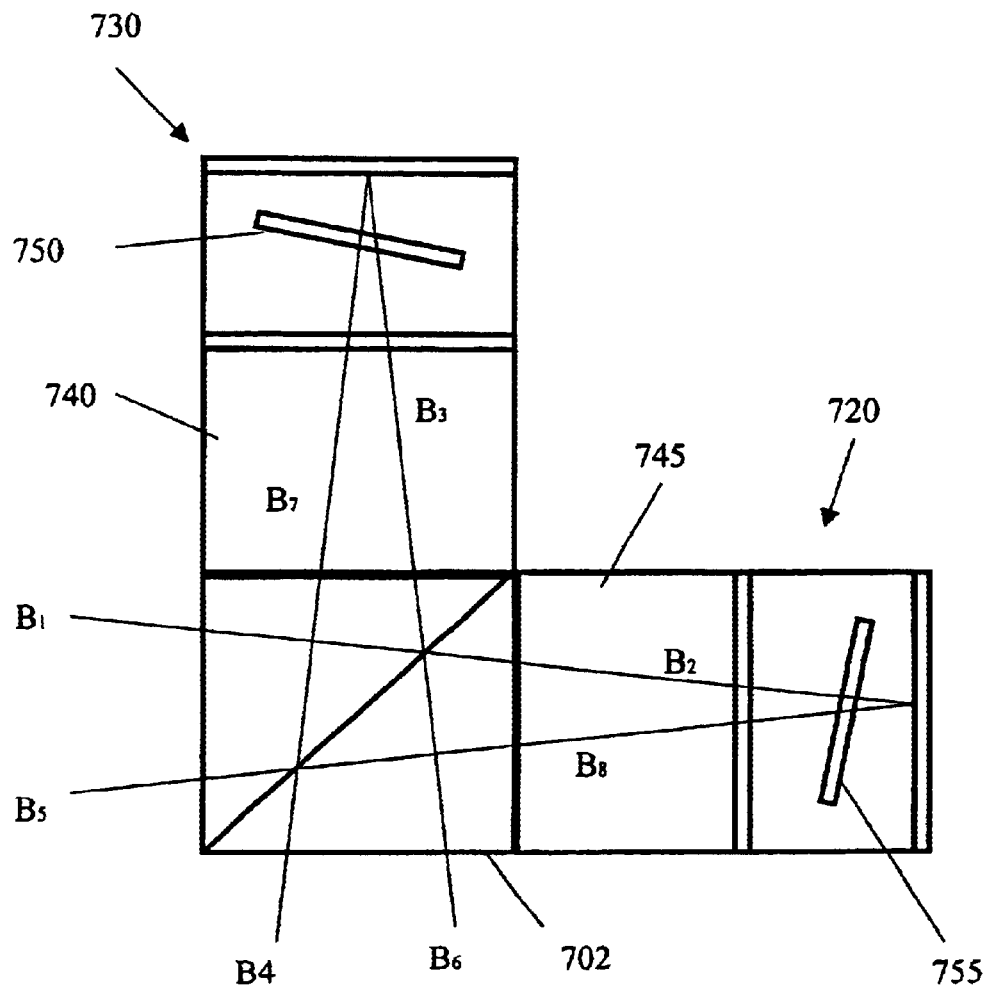
FIG. 7b illustrates the alternative manner of injecting optical beams of FIG. 7a in use in a polarization dependent embodiment.

FIG. 7b illustrates a polarization dependent version of the angled incidence embodiment of FIG. 7a. Delay sections 740 and 745 are added to provide a relative delay of L or L+Δ between the s and p components of the split beams $B_2$ and $B_3$, respectively. Moreover, waveplates 750 and 755 are included to provide the additional λ/4 delay.

FIG. 8 illustrates an alternate construction of interferometer 300 or interferometer 500 using a plate beam splitter 802. A GT etalon 820 is constructed similar to GT etalon 320 or GT etalon 520 and is coupled to plate beam splitter 802. GT etalon 830 is constructed similar to GT etalon 330 or GT etalon 530 and is coupled to plate beam splitter 802. GT etalons 820 and 830 are coupled to plate beam splitter with an appropriate optical path difference. As shown, when an optical beam $B_1$ is injected at an angle to the normal of plate beamsplitter 802, beam $B_1$ is split into a beam $B_3$ directed towards GT etalon 830 at an angle to the normal and a beam $B_2$ directed towards GT etalon 820 at an angle to the normal. When beam $B_3$ and beam $B_2$ are reflected back as beams $B_7$ and $B_8$, respectively, beams $B_7$ and $B_8$ intersect at splitter interface 822 and combine to create beams $B_5$ and $B_4$ as outputs.

Figure 8A:
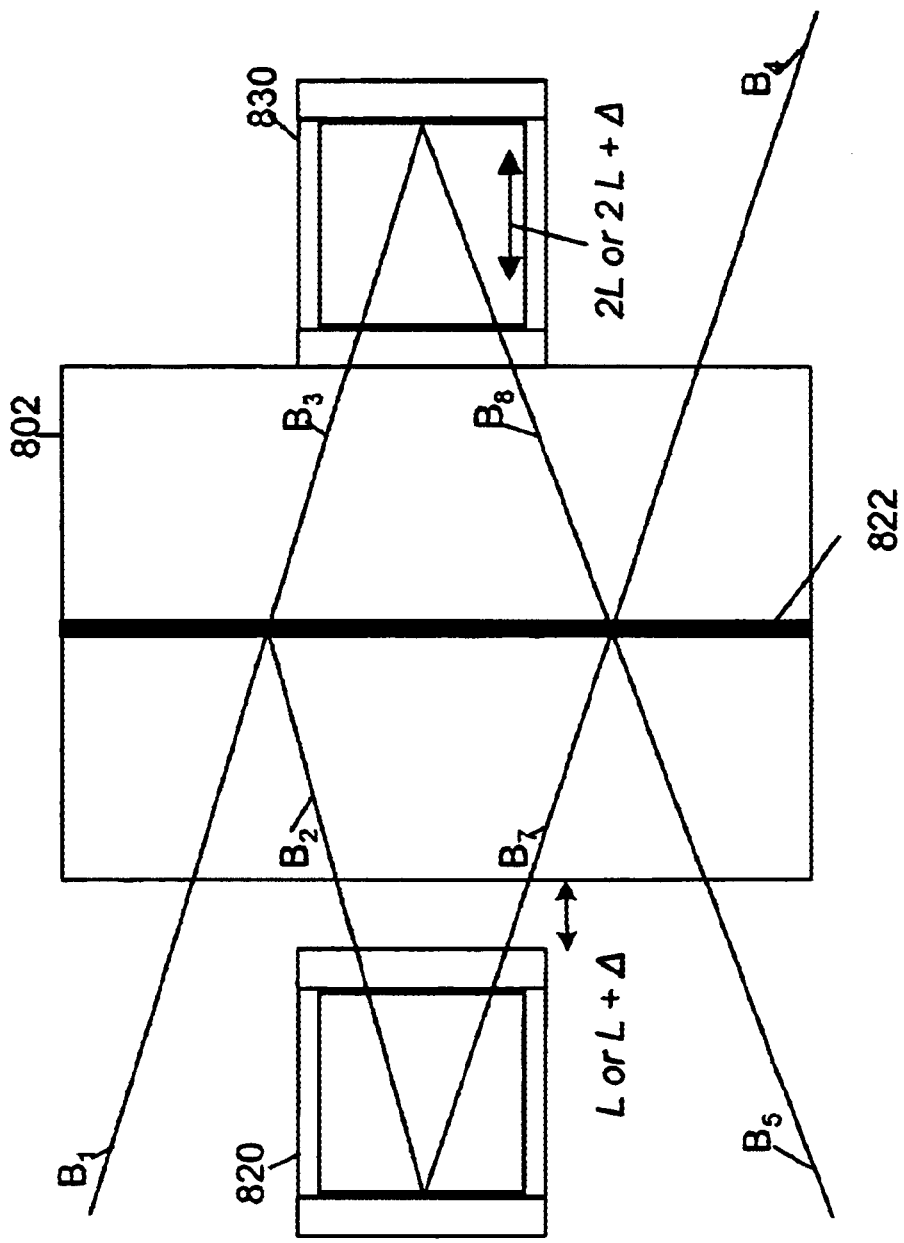
FIG. 8a illustrates an alternate construction of the interferometer 300 or the interferometer 500 using a plate beam splitter 802.
Figure 8B:
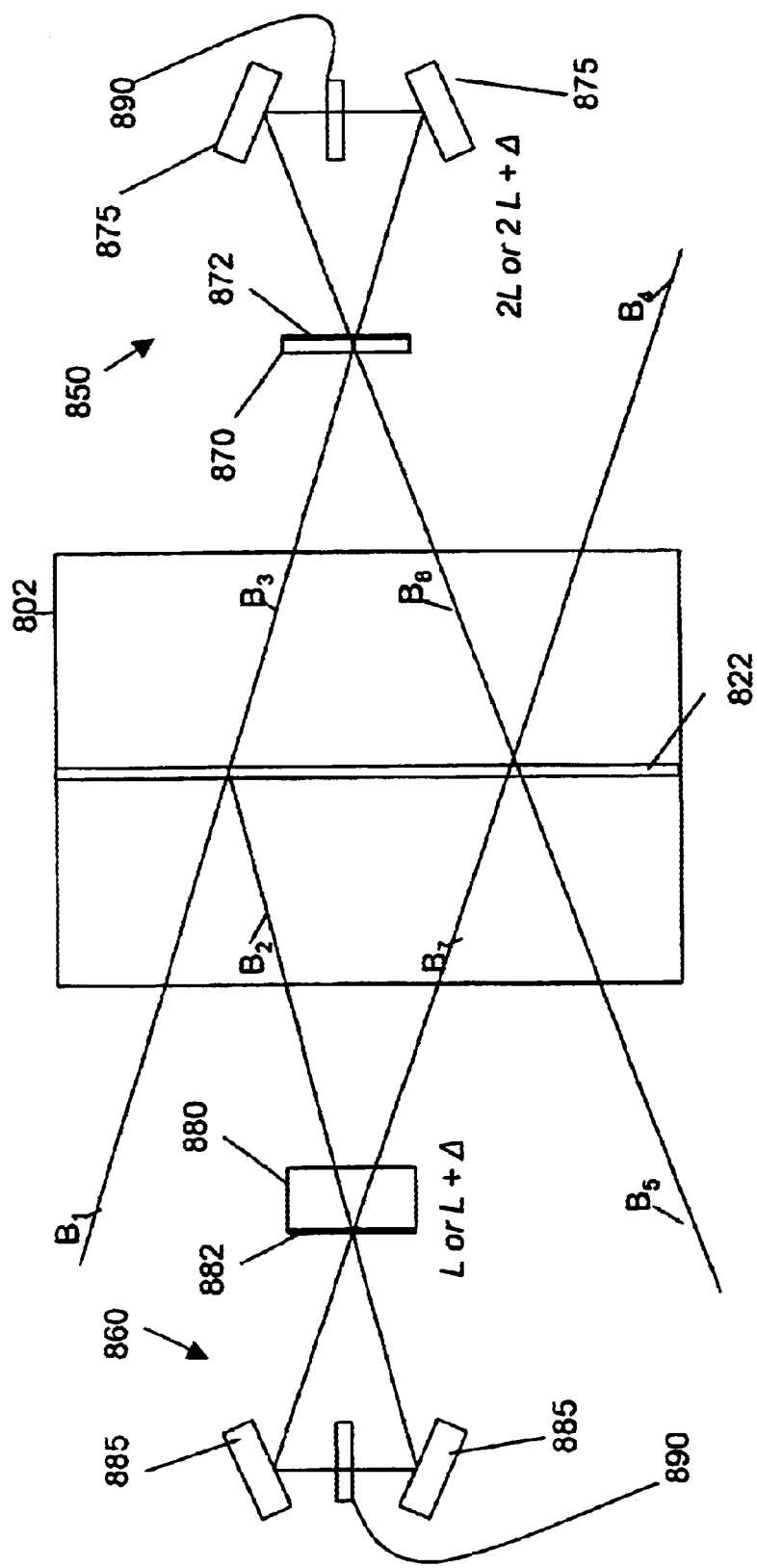
FIG. 8b illustrates an alternative construction of the interferometer of FIG. 8a using ring resonators.

In FIG. 8b the GT etalons 820 and 830, illustrated in FIG. 8a, are replaced by ring resonators 850 and 860. The ring resonator 840 includes a front body 870 with a partially reflective surface 872, and two angled mirrors 875. The ring resonator 860 includes a front body 880 with a partially reflective surface 882, and two angled mirrors 885. Any number of angled mirrors can be used to form the ring resonator, as known in the industry. The front body 880 has an index of refraction different than the remainder of the optical path, and is wider than the front body 870, thereby creating an optical path length difference of L or L+Δ as hereinbefore described. Tuning plates 890 are provided in the ring resonators 850 and 860 to enable the cavity length thereof to be tuned to 2 L or 2 L+Δ as hereinbefore described.

A polarization-based version of the aforementioned device is also possible, in which the front bodies 870 and 880 are formed of a birefringent material creating an optical path length difference of L or L+Δ between orthogonally polarized components of the sub-beams $B_3$ and $B_2$, respectively. Preferably, both cavities 850 and 860 also include a birefringent element, e.g. by replacing the tuning plates by waveplates 890, for creating an additional cavity length difference of λ/4 for the two orthogonal components, as hereinbefore described. Moreover, a single resonator device, as in FIGS. 6a and 6b, can also be constructed by using only one ring resonator 850.

Figure 9:
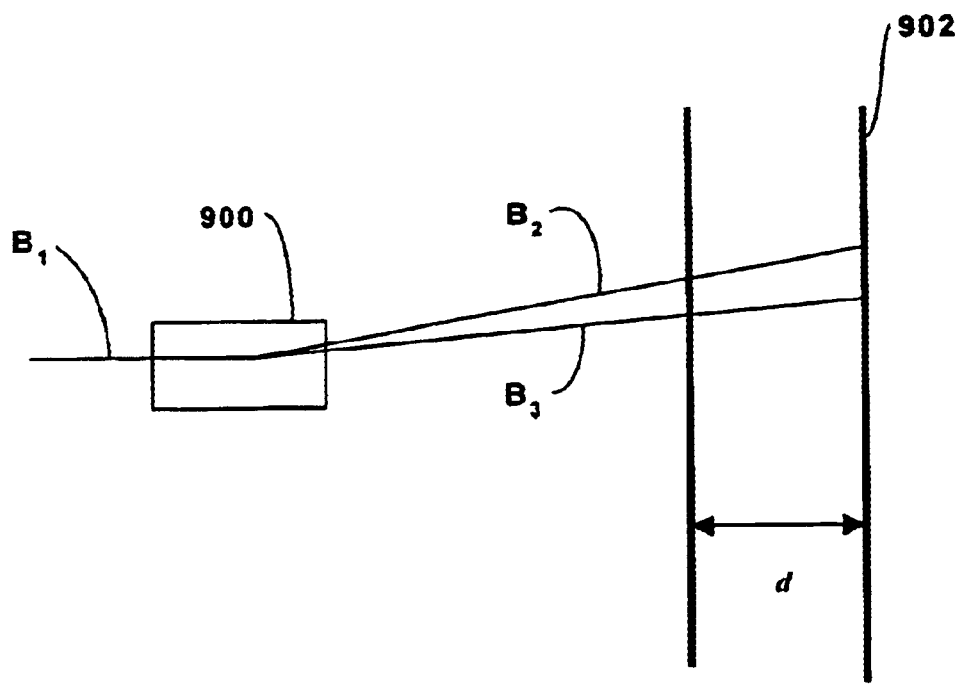
FIG. 9 illustrates an embodiment to create two de-phased GT etalons using the fact that the resonance peak of a GT etalon changes as the angle of the incident beam is varied.

In addition to alternate configurations and beam injections, alternate manners of effectively creating two de-phased GT etalons other than physically separate etalons are considered within the scope of the present invention. One such manner is illustrated with regard to the embodiment of FIG. 6, which uses polarized light and a waveplate in the cavity of a GT etalon. FIG. 9 illustrates another manner in which two de-phased GT etalons can be created.

FIG. 9 illustrates an embodiment to create two de-phased GT etalons using the fact that the resonance peak of a GT etalon changes as the angle of the incident beam is varied. As illustrated in FIG. 9, a polarizing beam splitter 900, such as a Wallaston prism, splits an input beam $B_1$ into linearly polarized beams $B_2$ and $B_3$ have an angle therebetween. Both beams $B_2$ and $B_3$ are directed towards a GT etalon 902 with a cavity length d designed to be operable on the desired channel spacing. Beams $B_2$ and $B_3$ have different incidence angles because of the angle therebetween. This causes the resonance peak of GT etalon 902 for beam $B_2$ to be shifted from the resonance peak of GT etalon 902 for beam $B_3$. For instance, if the incident angle on GT etalon 902 for beam $B_3$ is 0.65 degrees and the incident angle on GT etalon 902 for beam $B_2$ is ~1.1 degrees, there is a shift in the resonance peak of 25 GHz. This is an appropriate shift for applications using 50 GHz channel spacing because, as previously described, it is preferable for the resonance peak to be shifted by ½ of the etalon free spectral range ($FSR_{GT}$), which is equal to the channel spacing.

Figure 10A:
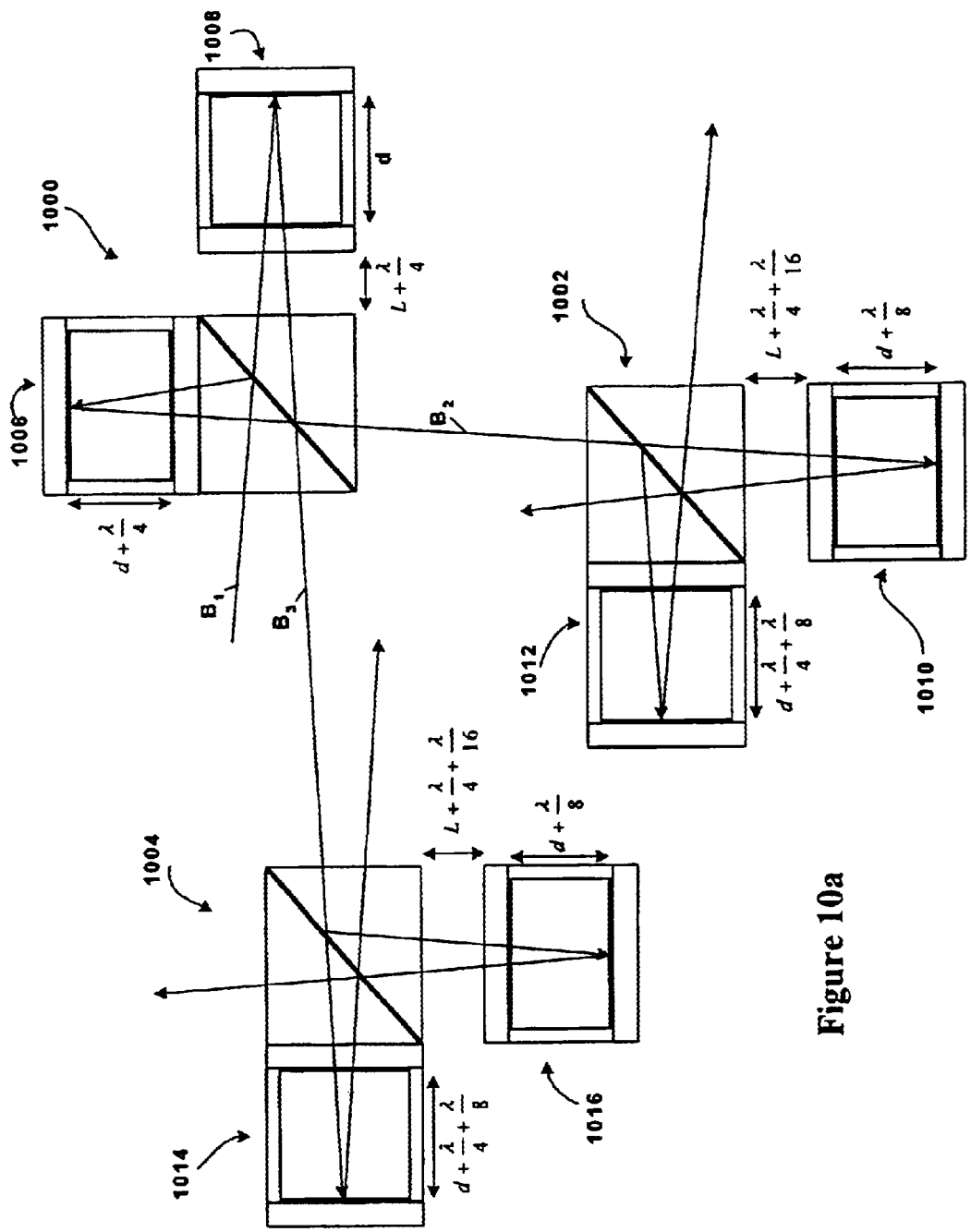
Figure 11A:
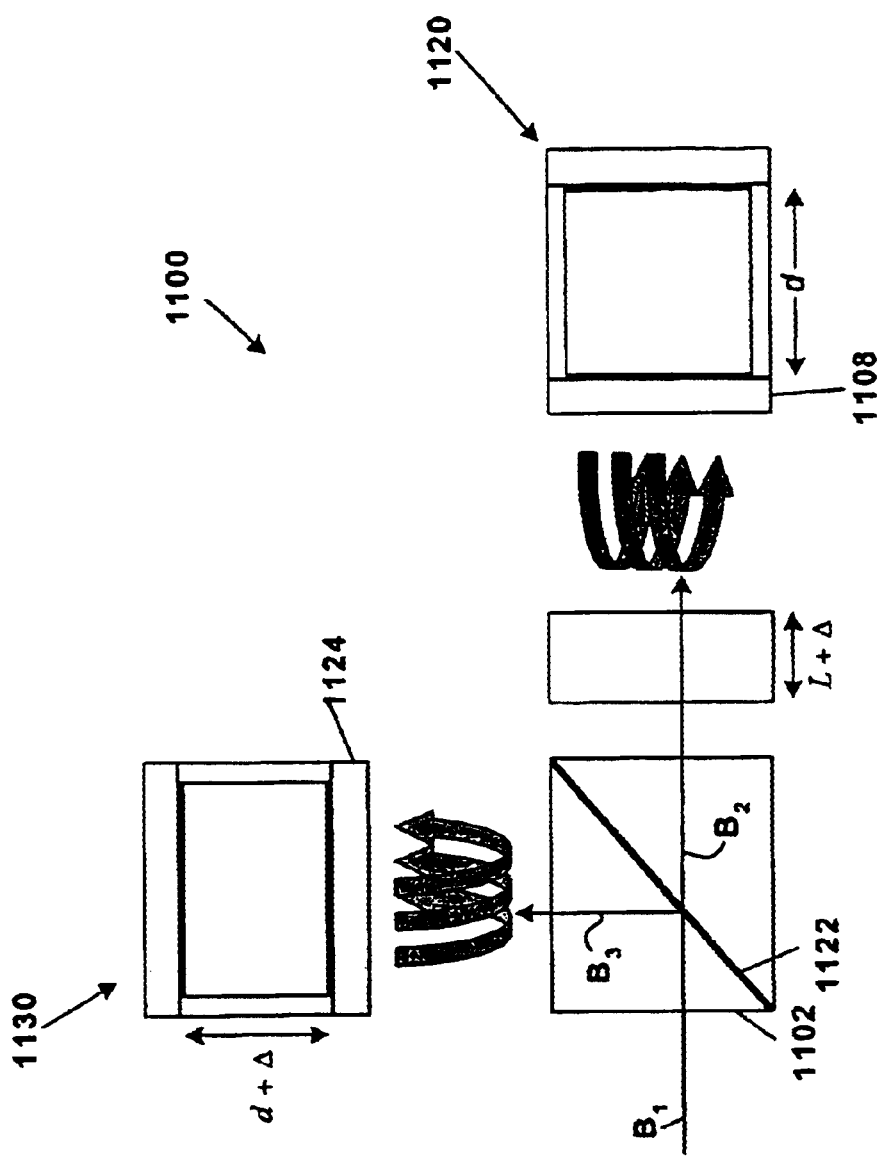
Figure 12A:
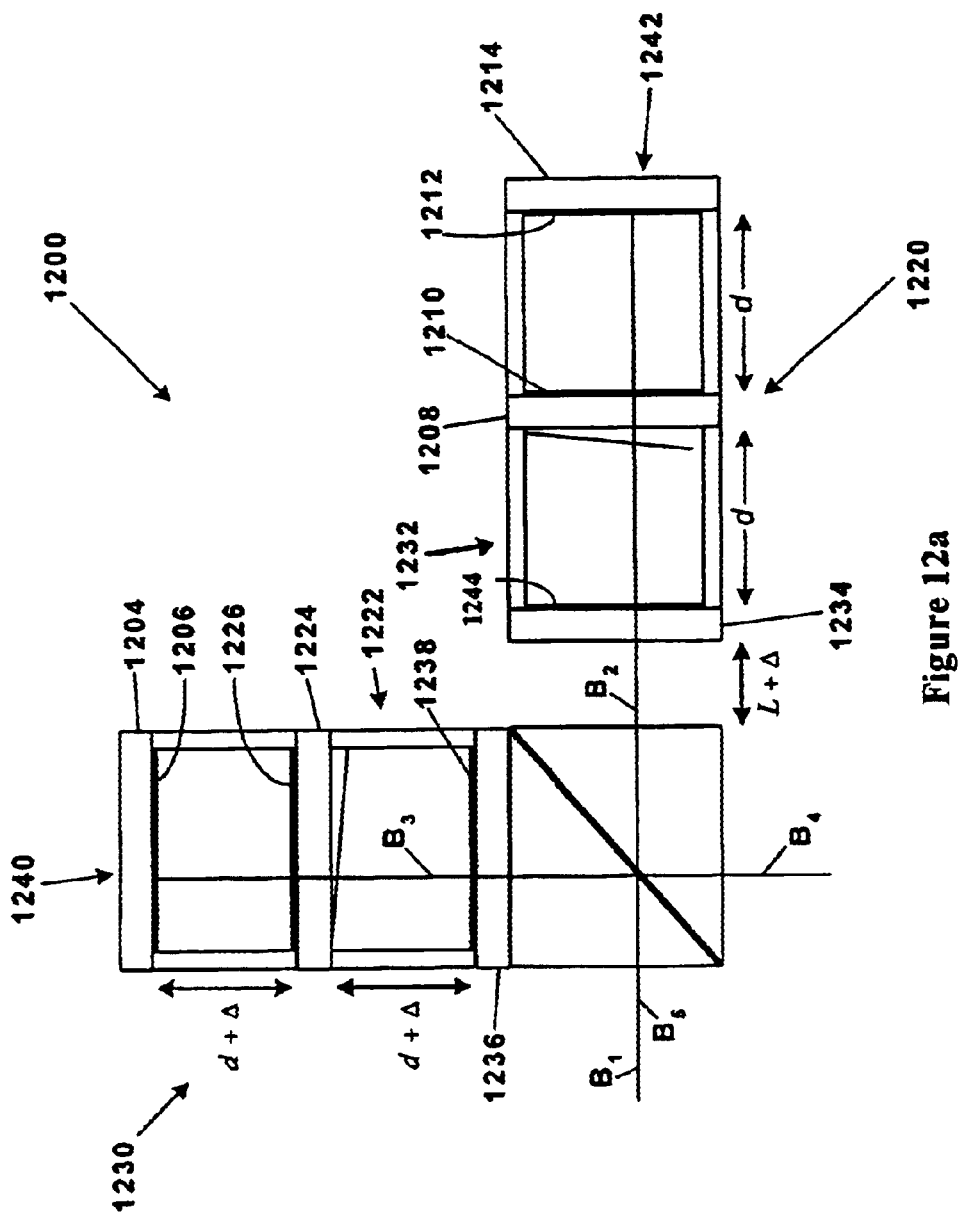
FIG. 12a illustrates another embodiment to further reduce the chromatic dispersion in the embodiment of FIG. 5a using multi-cavity etalons.

As previously discussed, the embodiment of FIG. 5a provides for reduced dispersion. For smaller channel spacing such as 25 GHz, the dispersion magnitudes are ~100 ps/nm. Unfortunately, for some applications this amount of dispersion is not acceptable. Accordingly, FIGS. 10a, 11a and 12a illustrate embodiments to further reduce the chromatic dispersion produced by interferometer 500 of FIG. 5*a*. The basis for all three embodiments is to provide a means for producing complementary dispersion profiles for compensating the interferometer's original dispersion profiles. The complementary dispersion profiles have similar periodicity and amplitudes as the original, but the compensating profiles have been shifted so that the positive slopes of one profile are aligned with the negative slopes of the other profile. Accordingly, overall dispersion is greatly reduced.

FIG. 10*a* illustrates an embodiment to further reduce the chromatic dispersion in the embodiment of FIG. 5*a* by cascading the interferometer of FIG. 5 with a second similar interferometer. As shown, an interferometer 1000 like interferometer 500 has a second interferometer 1002, similar to interferometer 1000, placed in cascade for one of interferometer 1000's outputs and a third interferometer 1004, also similar to interferometer 1000, placed in cascade for interferometer 1000's other output.

When an optical beam $B_1$ carrying a set of channels is input to interferometer 1000, a first subset of channels (e.g. even ITU channels) is output as beam $B_2$ to interferometer 1002 with some remaining dispersion, while a second subset of channels (e.g. odd ITU channels) is output as beam $B_3$ to interferometer 1004, also with some remaining dispersion. The interferometer 1002 compensates for this remaining dispersion in beam $B_2$ and outputs the first subset of channels with a further reduced dispersion profile. The interferometer 1004 compensates for the remaining dispersion in beam $B_2$ and outputs the second subset of channels with a further reduced dispersion profile 1030.

As described above in conjunction with FIG. 5*a*, for the preferred embodiment of interferometer 1000, interferometer 1000 has the effective cavity length of GT etalon 1006 shifted by $\lambda/4$ (i.e. $d+\lambda/4$) and the effective optical path difference is also shifted by $\lambda/4$ (i.e. $L+\lambda/4$). This reduces the chromatic dispersion of interferometer 1000. The remaining dispersion of interferometer 1000 has a quasi-periodic structure with a period of half of the channel spacing. An exemplary dispersion profile for interferometer 1000 is illustrated as line 1020 in FIG. 10*b*.

Because of the quasi-periodic nature of the remaining dispersion of interferometer 1000, interferometer 1002 and interferometer 1004 can compensate for it when they have an additional effective cavity shift and an extra effective optical path difference. The additional effective cavity shift and an extra effective optical path difference shifts the dispersion profiles of interferometers 1002 and 1004 to compensate for the remaining dispersion of interferometer 1000. Interferometer 1002 and interferometer 1004 preferably have an additional effective cavity shift of a quarter of a channel's spacing and an extra effective optical path difference of a half of a channel's spacing. Therefore, it is preferable for interferometer 1002 to have a GT etalon 1012 which has an additional $\lambda/8$ shift (i.e. $d+\lambda/4 +\lambda/8$) in the effective cavity length, and an additional shift in the effective optical path difference between the two GT etalons 1012 and 1010 of $\lambda/16$ (i.e. $L+\lambda/4+\lambda/16$). Likewise, it is preferable for interferometer 1004 to have a GT etalon 1014 which has an additional $\lambda/8$ shift (i.e. $d+\lambda/4+\lambda/8$) in the effective cavity length and an additional shift in the effective optical path difference between the two GT etalons 1014 and 1016 of $\lambda/16$ (i.e. $L+\lambda/4+\lambda/16$).

With an additional $\lambda/8$ shift in the effective cavity length and an additional $\lambda/16$ shift in the effective optical path difference, interferometer 1002 and interferometer 1004 each produce a shifted dispersion profile as described above. This is illustrated by line 1022 in FIG. 10*b*. The shifted dispersion profile 1022 compensates for the dispersion profile 1020, which produces a reduced dispersion profile 1030 as illustrated in FIG. 10*c*.

It should be noted that cascading two interferometers as described results in a reduced flat pass band. This is illustrated conceptually in FIGS. 11*d* and 10*e*. FIG. 10*d* illustrates an exemplary passband 1040 of interleaver 1000 for a single channel and an exemplary passband 1042 of interferometer 1002 or 1004 for the same channel. As can be seen, the additional effective cavity shift and an extra effective optical path difference in interferometer 1002 or interferometer 1004 also cause a shift in the center frequency of passband 1042 relative to passband 1040. The average passband is indicated by line 1046. The resultant cascaded passband 1048 has higher isolation, i.e. steeper sides, but a reduced flat passband width. While the flat passband is reduced, the cascaded arrangement improves the isolation, which provides the ability to find better compromises in terms of bandwidth vs. isolation for individual devices.

Typical values obtainable for the embodiment of FIG. 10*a* with a reflectivity of 2.2% for the partially reflective coatings of the GT etalons are as follows:

|  | 50 GHz Channel Spacing | 25 GHz Channel Spacing |
| --- | --- | --- |
| MAX. DISPERSION | +/−6 ps/nm | +/−23 ps/nm |
| BANDWIDTH @ 1 dB | 28 GHz | 14 GHz |
| CROSSTALK | >35 dB | >30 dB |

FIG. 11*a* conceptually illustrates another embodiment to further reduce the chromatic dispersion in the embodiment of FIG. 5*a*. This embodiment is similar to that of FIG. 5 except that the beams $B_2$ and $B_3$ are multi-passed two or more times through respective GT etalons 1120 and 1130. By multi-passing the GT etalons 1120 and 1130, without allowing the two interferometer arms to beat and while maintaining the optical path difference, a further reduction of the dispersion remaining in the embodiment of FIG. 5 is provided. As the number of times beams $B_2$ and $B_3$ are passed through respective GT etalons 1120 and 1130 are increased, the more the chromatic dispersion is decreased. It should be noted, however, that as the number of passes increases, the reflectivity of the front plates 1124 and 1108 needs to be reduced to give the same interleaver output. In addition, as the level of reflectivity for front plates 1124 and 1108 is reduced, the sensitivity to the actual level of reflectivity increases. For instance, if the reflectivity of front plates 1124 and 1108 varies by more than 0.1% for a quadruple pass of beams $B_2$ and $B_3$, significant changes in the profile may be observed.

Figure 11B:
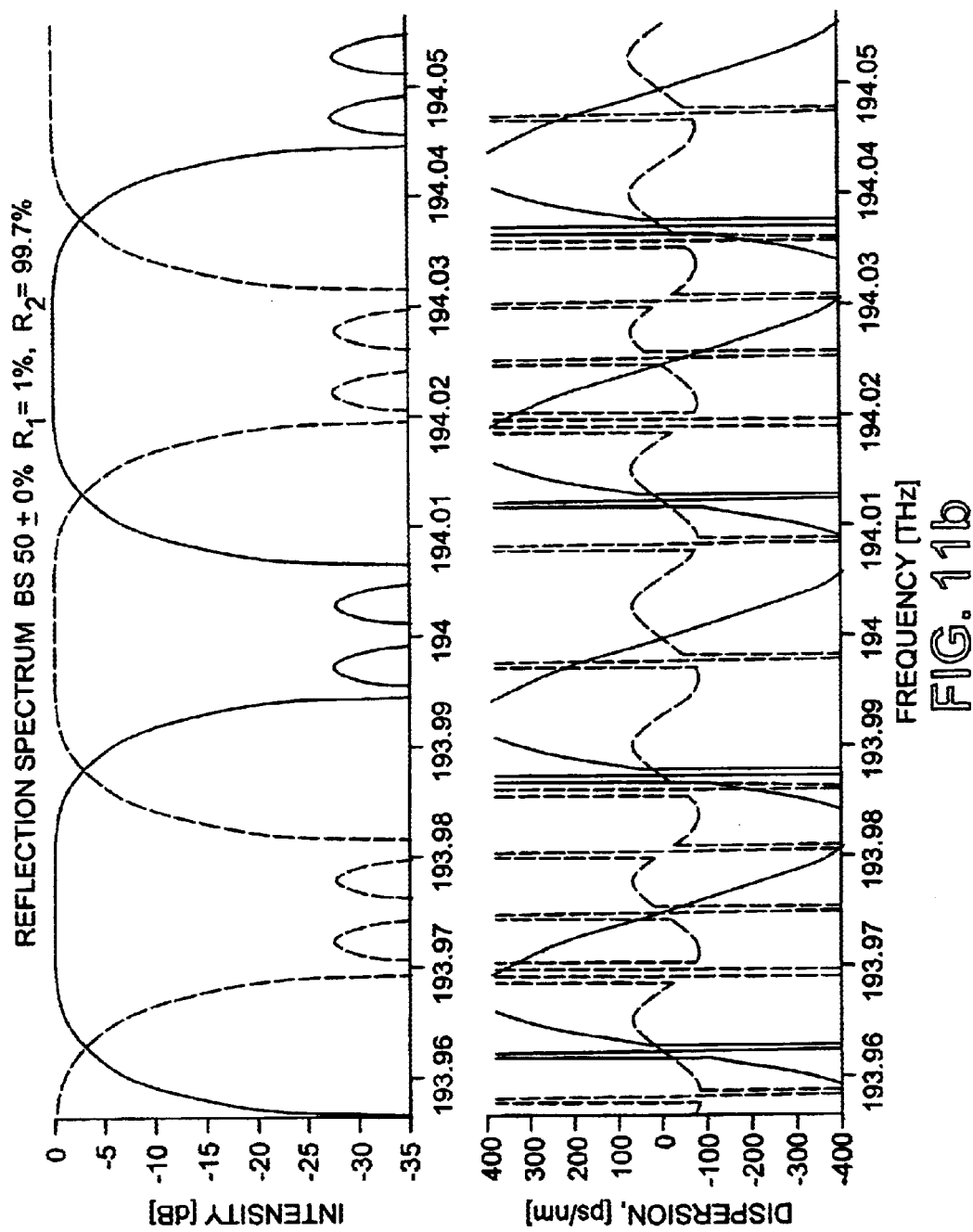
FIGS. 11b and 11c illustrate spectral responses and chromatic dispersion profiles for a double pass and quadruple pass respectively.
Figure 11C:
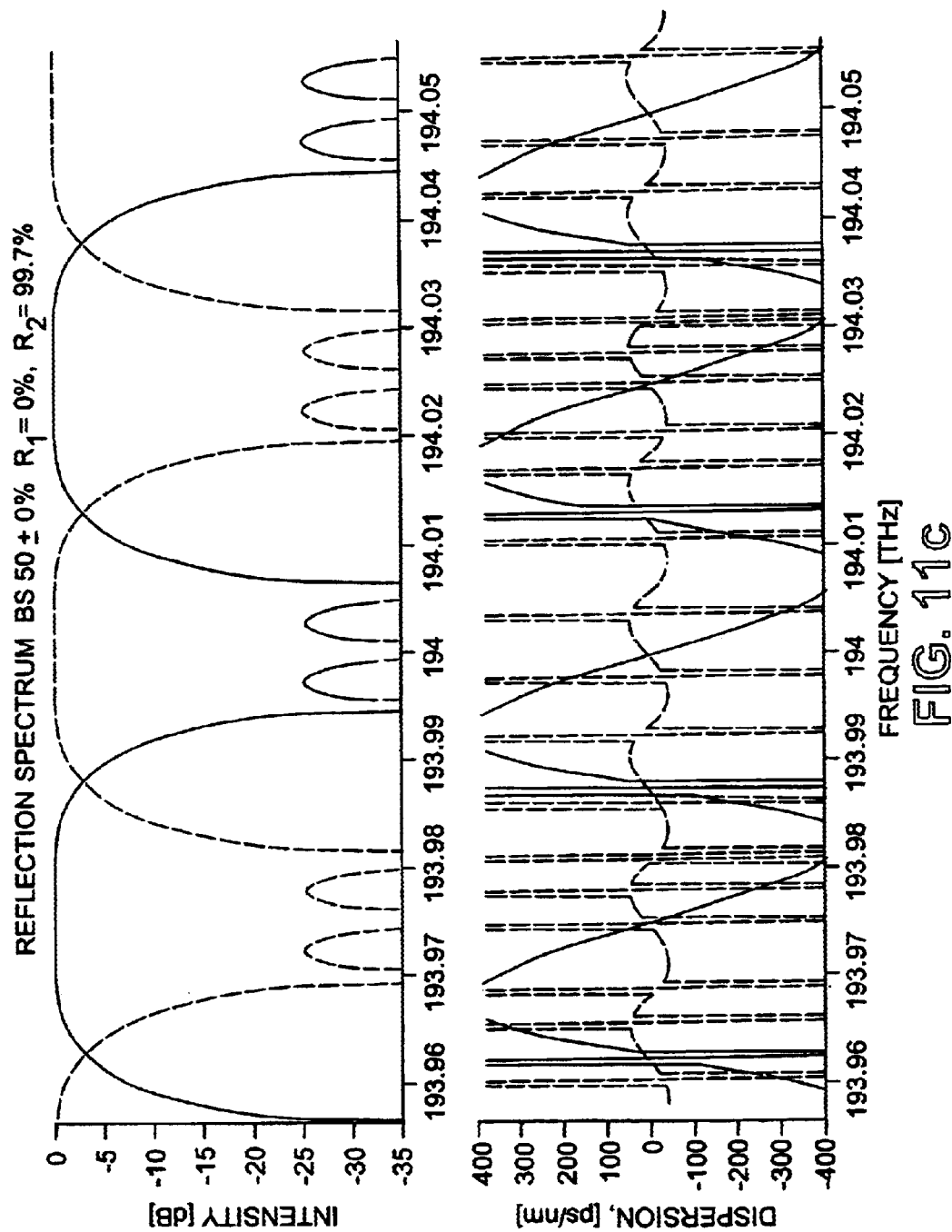

FIGS. 11*b* and 11*c* illustrate spectral responses and chromatic dispersion profiles for a double pass and quadruple pass respectively. For a double pass, the reflectivity of front plates 1124 and 1108 is 0.7%, while for the quadruple pass the reflectivity is lowered to 0.2%. As can be seen in FIG. 11*b*, the residual dispersion is reduced to <70 ps/nm and the cancellation effect also becomes more effective because of the matching of the dispersion slopes and linearity. As shown in FIG. 11*c*, for a quadruple pass with front reflectivity's of 0.2%, the dispersion is further reduced to 35 ps/nm.

FIG. 1*d* illustrates one embodiment for multi-passing beams $B_2$ and $B_3$ through respective GT etalons based on polarization. A linear polarized optical beam $B_1$ is incident on a polarization beam splitter cube 1102. Optical beam $B_1$ has a polarization orientation that is 45° to the effective fast axis of polarization beam splitter cube 1102. This causes beam $B_1$ to be split into two linearly polarized beams $B^1_3$ and $B^1_2$ with orthogonal polarizations. Beam $B^1_3$ is directed towards GT etalon 1120, and beam $B^1_2$ is directed towards GT etalon 1130. Beams $B^1_3$ and $B^1_2$ pass through quarter waveplates 1106 and 1107, respectively, which causes beams $B^1_3$ and $B^1_2$ to become circularly polarized beams. On being reflected from each arm they re-pass through the corresponding quarter waveplate, which now causes beams $B^1_3$ and $B^1_2$ to become linear polarized light with a polarization orientation orthogonal to their original orientations. Therefore, reflected beam $B^1_3$ is reflected at splitter interface 1122, while beam $B^1_2$ is transmitted through at splitter interface 1122.

This results in beams $B^1_3$ and $B^1_2$ being directed towards rooftop reflector 1104 after combining at splitter interface 1122. Rooftop reflector 1104 directs the combined beams $B^1_3$ and $B^1_2$ back to splitter interface 1122, where beam $B^1_3$ is again directed towards GT etalon 1120 as beam $B^2_3$ and beam $B^1_2$ is again directed towards GT etalon 1130 as beam $B^2_2$. Beams $B^2_2$ and $B^2_3$ again pass through the respective GT etalons 1130 and 1120 and return to splitter interface 1122. The effective optical path difference between the arms is made to be $$\frac{L+\Delta}{2}$$

so that the double pass results in a net effective optical path difference of L+Δ. Beams $B^2_2$ and $B^2_3$ are recombined at splitter interface and output as beam $B_4$. An additional polarization beam splitter (not shown) is used to separate one set of channels from the other set of orthogonally polarized channels.

FIG. 12a illustrates another embodiment to further reduce the chromatic dispersion in the embodiment of FIG. 5a. In this embodiment, multi-cavity GT etalons 1220 and 1230 are used in the arms of the Michelson interferometer configuration with an effective optical path difference between the arms. As shown, multi-cavity GT etalons 1220 and 1230 have multiple cavities of cavity length d chosen to operate on predetermined channel spacing, e.g. 25 GHz.

A back cavity 1240 of the multi-cavity GT etalon 1230 is similar to the cavity of GT etalon 530 and is formed from a back plate 1204 with a highly reflective (near 100%) coating 1206 and a wedge shaped intermediate plate 1224 having a partially reflective coating 1226. A forward cavity 1222 of the GT etalon 1230 is formed from a front plate 1236 with a coating 1238, providing very low reflectivity, and the intermediate plate 1224. Likewise, a back cavity 1242 of multi-cavity GT etalon 1220 is similar to the cavity of GT etalon 520, and is formed from a back plate 1214, with a highly reflective (near 100%) coating 1212, and a wedge shaped intermediate plate 1208 having a partially reflective coating 1210. A forward cavity 1232 of the GT etalon 1220 is formed from a front plate 1234, with a coating 1244 providing very low reflectivity, and the intermediate plate 1208. Preferable reflectivities are 99.5% for back coatings 1206 and 1212, 2.2% for intermediate coatings 1210 and 1226, and −39 dB for front coatings 1240 and 1238 (corresponding to about 0.013%). The intermediate plates 1208 and 1224 are in the shape of wedges to prevent any back reflections from the front surfaces thereof from affecting the function of the forward resonant cavities 1222 and 1232.

Similar to the embodiment of FIG. 5a, GT etalons 1230 and 1220 are slightly de-phased from one another such that the positive dispersion slope of one is aligned with the negative dispersion slope of the other. This is preferably achieved by changing the effective cavity length of each of the cavities of GT etalon 1230 by a length Δ. Preferably, the length Δ corresponds to approximately a λ/4 shift in the cavity length.

Also similar to the embodiment of FIG. 5a, the arms of the interferometer configuration have an optical path difference, L, between them, which is preferably equal to one-half the cavity length d. Preferably, the optical path difference L is also adjusted by Δ.

As with interferometer 500, interferometer 1200 acts to deinterleave channels when a beam $B_1$ comprising a set of channels, for example, ITU even and odd channels is input. The spectral response of beam $B_4$ results in beam $B_4$ carrying a first sub-set of channels, for example, even ITU channels, while the spectral response of beam $B_5$ results in beam $B_5$ carrying a second sub-set of channels, for example, odd ITU channels. In a similar fashion, interferometer 1200 acts to interleave channels when both beam $B_4$ carrying a first sub-set of channels (e.g., even ITU channels) and beam $B_5$ carrying a second sub-set of channels (e.g. odd ITU channels) are input to interleaver 1200. In this case beam B1 is output carrying the set of channels (e.g., the even and odd ITU channels).

FIG. 12b is a schematic representation of a solid version of the multi-cavity etalon embodiment of FIG. 12a, in which solid transparent blocks 1250, 1251, 1252 and 1253 with the appropriate coatings 1206, 1226, 1238, 1244, 1210 and 1212 thereon, define the resonant cavities. Preferably, the blocks 1250 and 1251 are slightly longer (i.e. by Δ) than the blocks 1252 and 1253, for reasons that have been hereinbefore discussed. The beamsplitter 1260 is comprised of a triangular section 1262 and a trapezoidal section 1264 with a 50/50 coating 1266 positioned therebetween. The trapezoidal section 1264 has the optical path length difference (i.e. L or L+Δ) built right in.

Figure 12C:
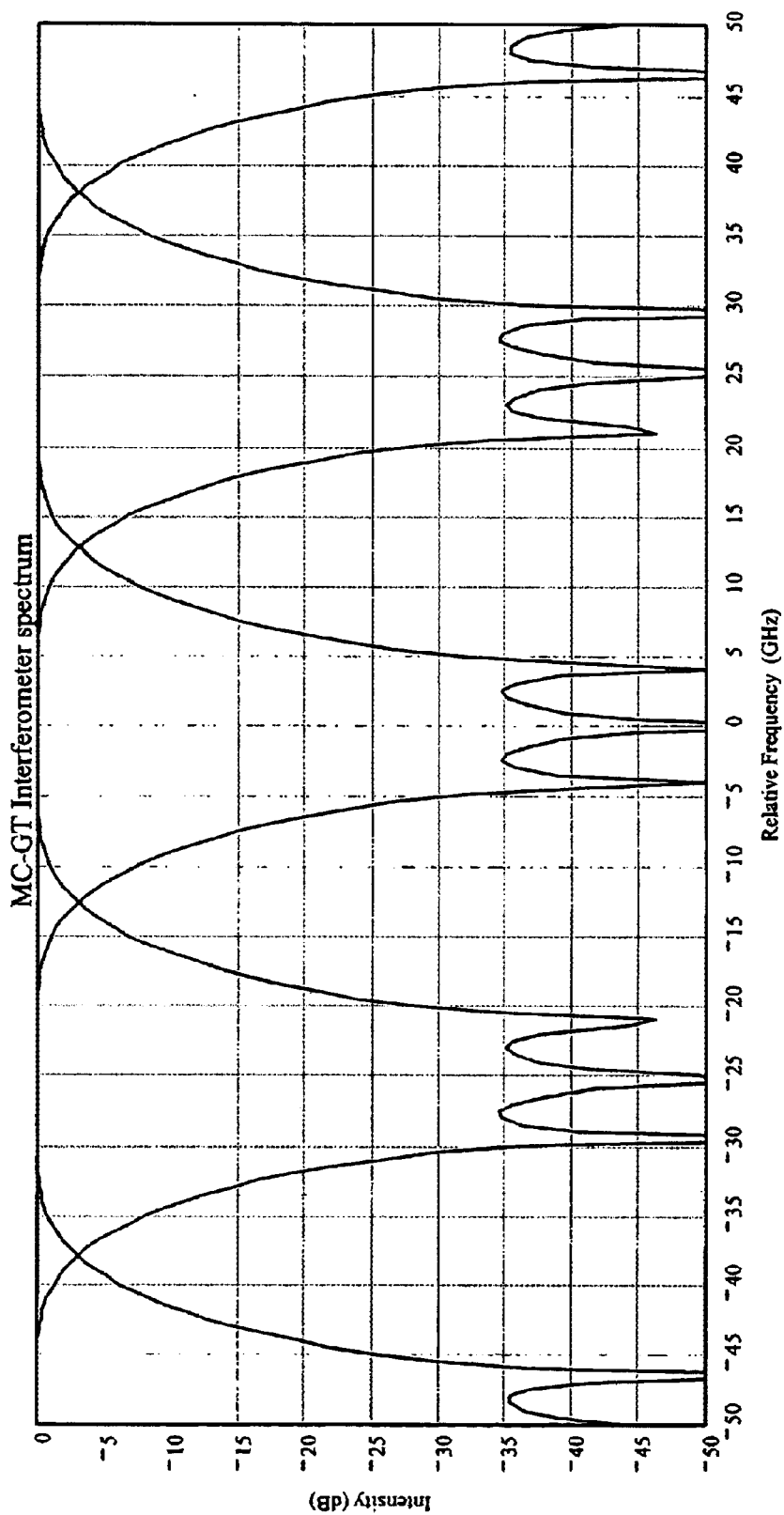

As seen in FIG. 12c, interferometer 1200 has a similar spectral response as interleaver 500. However, as shown in FIG. 12d, interferometer 1200 has a lower dispersion (line 1275) resulting from the forward resonant cavities 1222 and 1232 with the very low front reflectivity canceling the dispersion from the back cavities 1240 and 1242, respectively. The dispersion from one of the forward cavities is represented by line 1280, while the dispersion from one of the back cavities is represented by line 1285. These extra cavities don't perturb the spectrum, but significantly compensate for the dispersion. As can be seen from FIGS. 12c and 12d, typical values obtainable for the embodiment of FIG. 12a with a reflectivity of 2.2% for the partially reflective coatings and a very low reflectivity of −39 dB are as follows:

|  | 25 GHz Channel Spacing |
| --- | --- |
| MAX. DISPERSION OVER 3 dB BW | +/−3 ps/nm |
| BANDWIDTH @ .5 dB | 18 GHz |
| CROSSTALK | >35 dB |

Figure 12E:
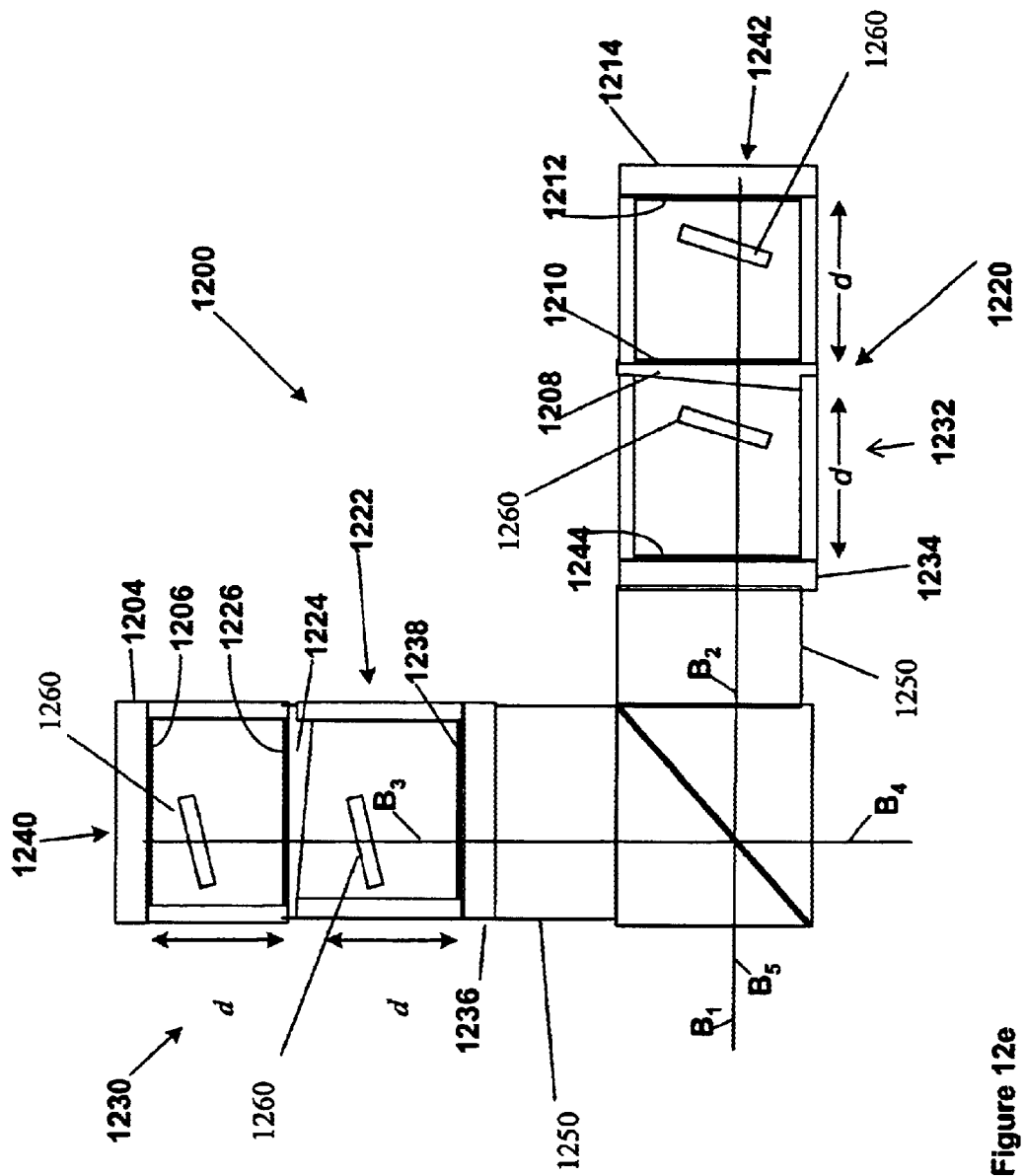
FIGS. 12e and 12f illustrate polarization-based embodiments using multi-cavity etalons.
Figure 12F:
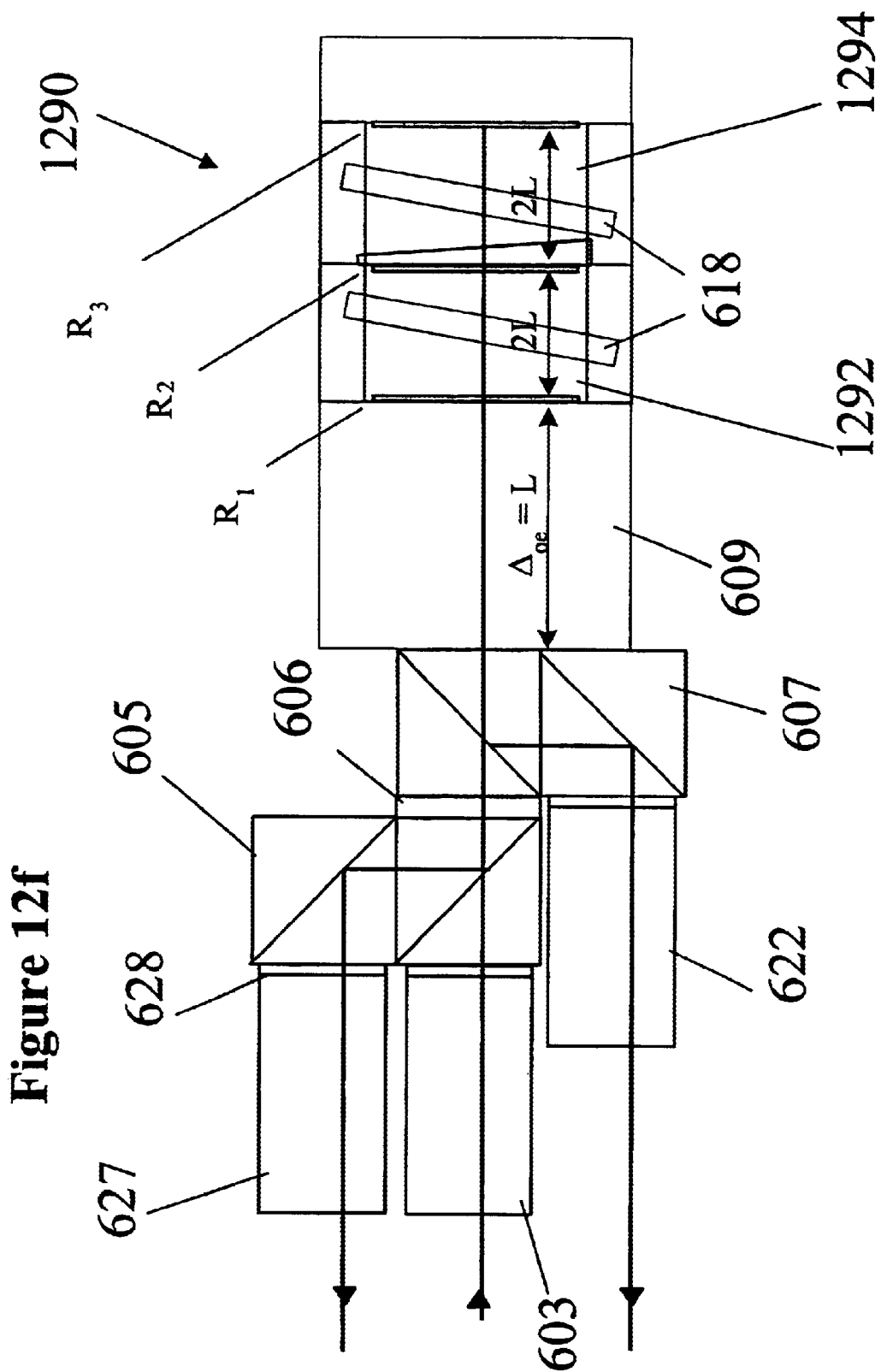

FIGS. 12e and 12f illustrate polarization dependent versions of the multi-cavity GT embodiments. The embodiment disclosed in FIG. 12e is similar to the embodiment of FIG. 12a, with the addition of an optical path delay section 1250 in each arm, and a quarter wave plate 1260 in each cavity.

The embodiment disclosed in FIG. 12f is similar to the embodiment of FIG. 6b, except that the single cavity GT etalon 600 is replace by a multi-cavity etalon 1290. The multi-cavity etalon 1290 includes a front cavity 1292 and a rear cavity 1294, which are defined by reflective surfaces $R_1$, $R_2$, and $R_3$.

Another method of greatly reducing chromatic dispersion in the signals exiting the interferometer 500 is by including a dispersion compensator 590 in front of the interferometer 500. The dispersion compensator 590 introduces an initial dispersion profile to the input signal $B_1$ that is complementary to the dispersion profile resulting from transmission through the interferometer 500. Accordingly, the overall dispersion of the system will be greatly reduced. The dispersion compensator 590 may comprise a GT etalon with the same FSR as the etalons 520 and 530; however, the optimum reflectivity of the front partially reflective surface of this GT etalon would be the same as that of the front reflective surfaces 1238 and 1244 of the multi-cavity etalon 1200, i.e. −39 dB or 0.013%. As hereinbefore discussed, GT etalons can be assembled using solid or air-filled gaps. Preferably, the dispersion compensator 590 comprises a Fabry-Perot (F-P) etalon with an FSR one half of the FSR of etalons 520 and 530, e.g. 12.5 GHz for a 25 GHz interleaver. Following along with an aforementioned example of interferometer 500 in which the reflectivity of the front reflective surfaces 510 and 526 is 2.2%, the partially reflective surfaces of the F-P etalon of the dispersion compensator 590 should also be 2.2% to provide a dispersion profile that is complementary to that of the interferometer 500, i.e. shifted enough so that the positive dispersion slopes of one profile line up with the negative dispersions slopes of the other.

Figure 12G:
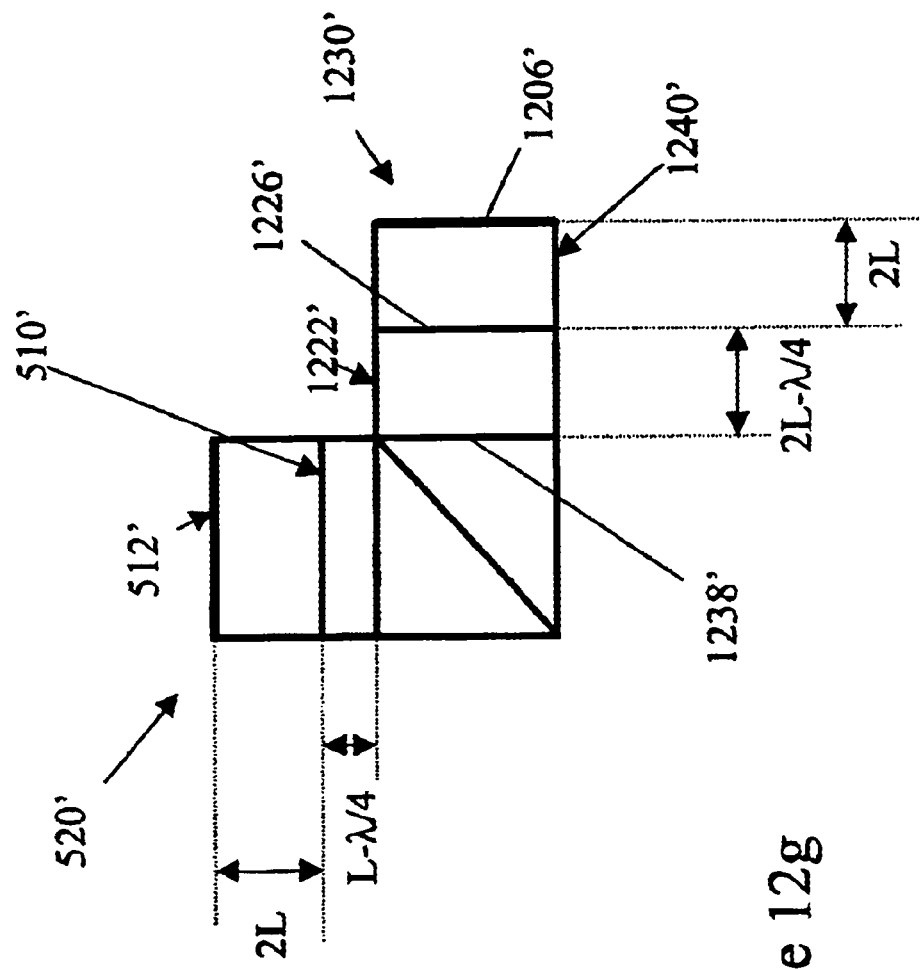
FIG. 12g illustrates a hybrid version of the present invention for a steep sloped response using one single cavity etalon and one multi-cavity etalon.
Figure 12H:
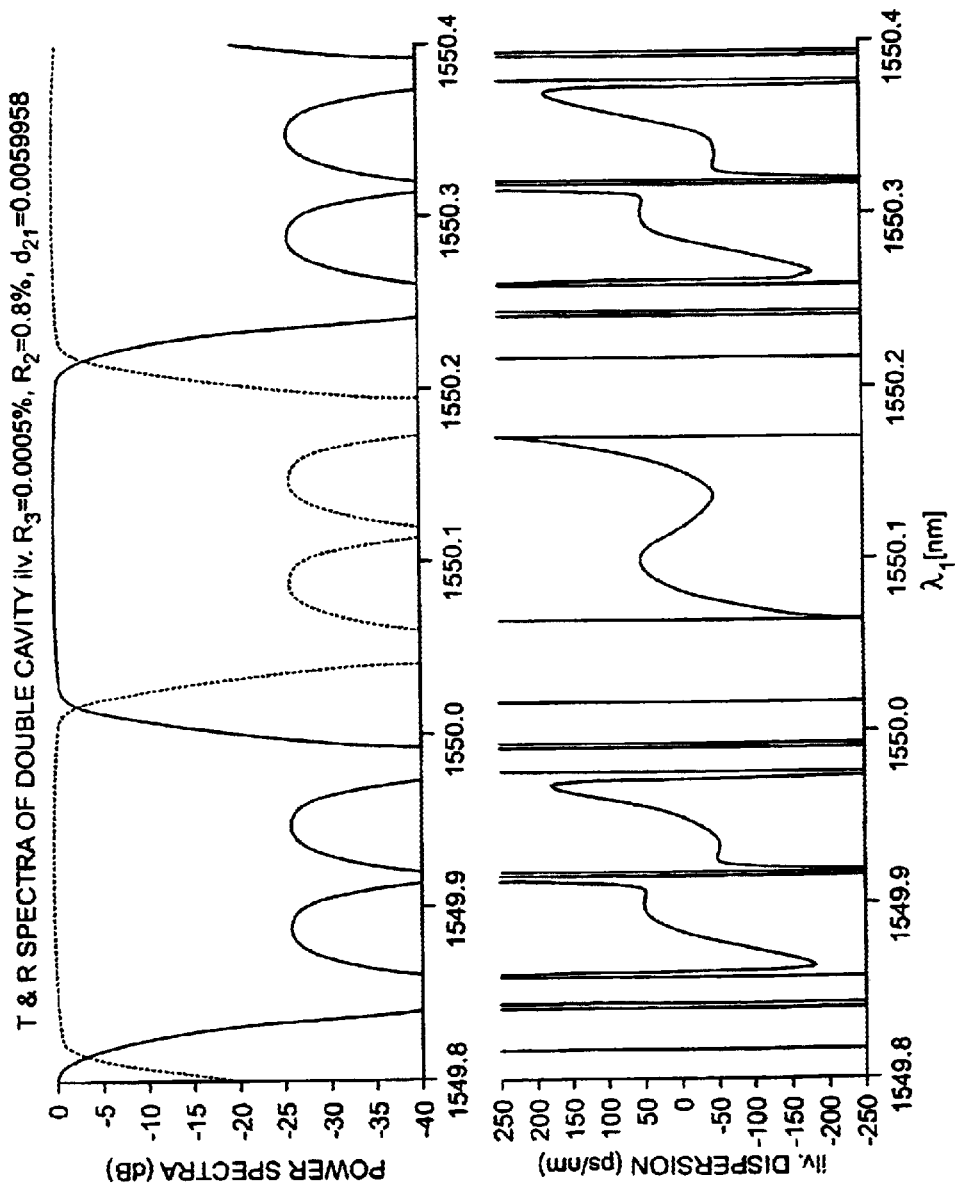
FIGS. 12h and 12i illustrate spectral responses and chromatic dispersion profiles, for two different sets of parameters in the embodiment of FIG. 12g.
Figure 12I:
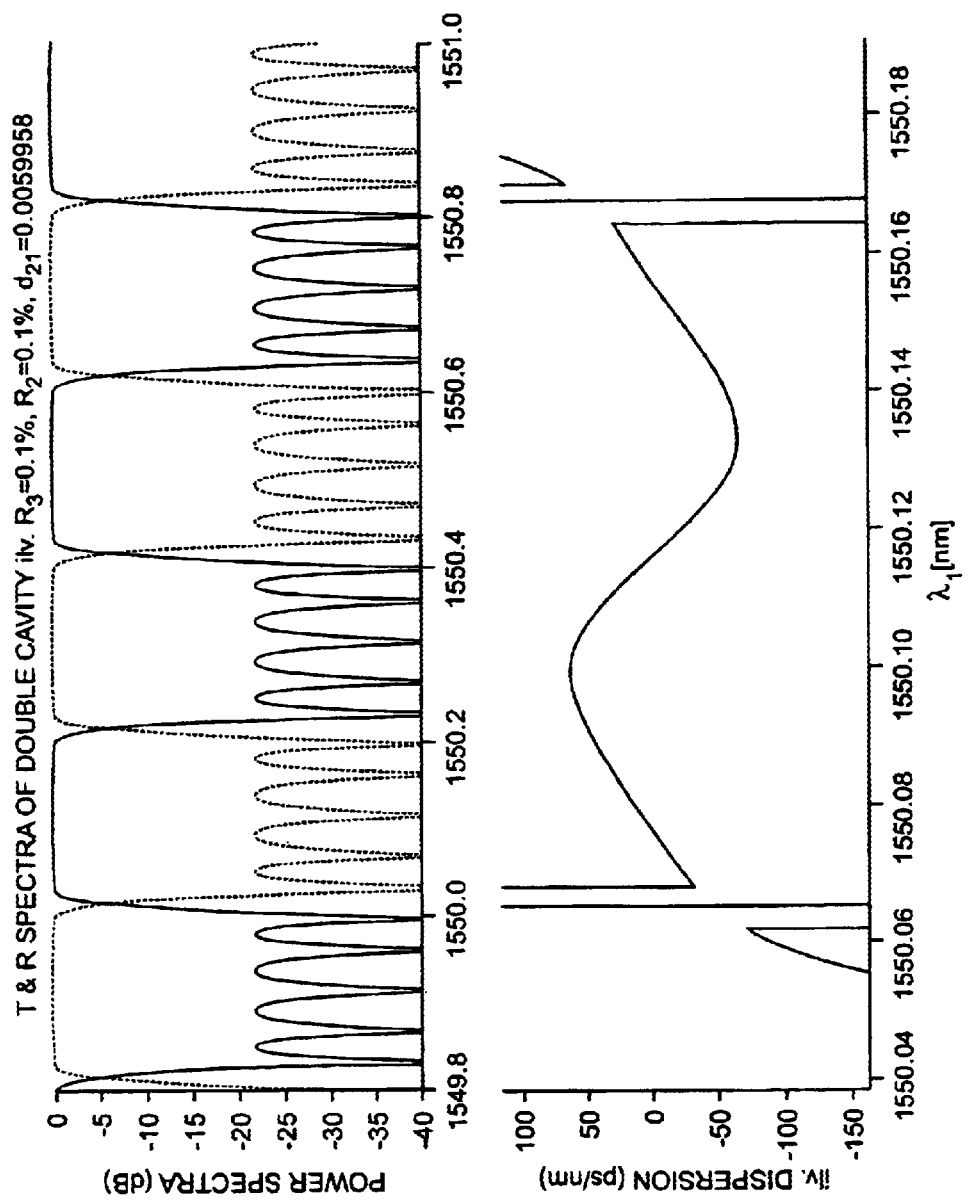

FIG. 12g illustrates a hybrid version of the present invention with a multi-cavity etalon 1230' (see FIG. 12a) in one arm and a single cavity etalon 520' (see FIG. 5a) in the other arm. The arm with the single cavity etalon 520' includes the L+Δ delay line. The single cavity etalon 520' has a front reflective coating 510', which preferably ranges between 0% and 2%, and a rear reflective coating 512', which preferably is close to 100%. The multi-cavity etalon 1230' has a front reflective coating 1238', which preferably ranges between 0% and 2%, an intermediate reflective coating 1226', which preferably ranges between 20% and 50%, and a rear reflective coating 1206', which preferably is close to 100%. In this embodiment, the front cavity 1222' is offset by A from the rear cavity 1240'. FIGS. 12h and 12i represent typical spectral responses for the interleaver of FIG. 12g. In FIG. 12h both front reflective coatings 510' and 1238' have a reflectivity of 0.8%, the intermediate reflective coating 1226' has a reflectivity of 35%, and both rear reflective coatings have a reflectivity of 99.99%. In FIG. 12i both front reflective coatings 510' and 1238' have a reflectivity of 0.1%, the intermediate reflective coating 1226' has a reflectivity of 35%, and both rear reflective coatings have a reflectivity of 99.99%. When compared with the spectral responses from FIGS. 5d, 11b and 11c, it is evident from the responses of the hybrid interleaver that the sides of the passbands are much steeper, with little or no loss of passband width.

Figure 13A:
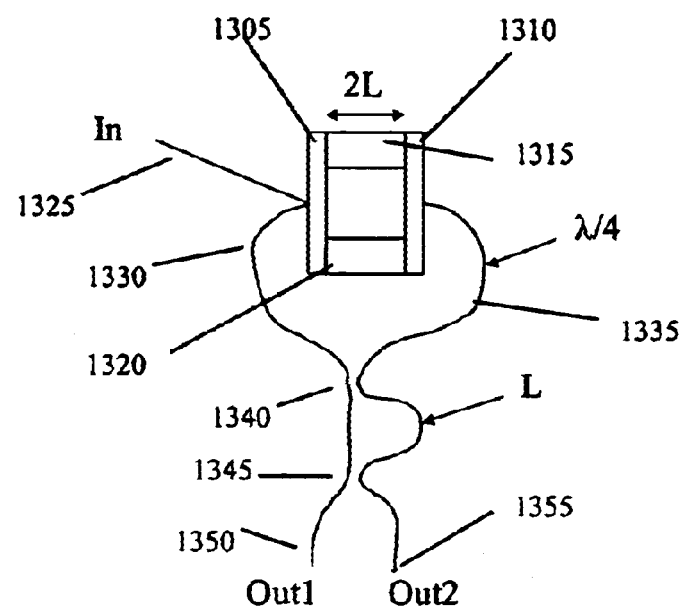
FIG. 13a illustrates an alternative embodiment of the present invention, wherein the transmitted and reflected fields from a single resonator are combined.

FIG. 13a illustrates the SEI version of the invention, in which a single etalon 1300 includes front and rear plates 1305 and 1310 with low reflectivity coatings, e.g. 2.2%. ULE spacers 1315 and 1320 hold the plates apart at a distance d=2 L=c/(η FSR cos(θ))=5994.2 microns for a 50 GHz interleaver. An input waveguide 1325 launches an input signal into the etalon 1300, while a first output waveguide 1330 collects the reflected light and a second output waveguide 1335 collects the transmitted light. One of the output waveguides, e.g. for the transmitted field, has an additional path length of λ/4, e.g. 387.5 nm, prior to an initial coupling in a first coupler 1340, and an additional path length of L, e.g. 2997.1, between the first coupler 1340 and a second coupler 1345. After coupling in the second coupler 1345 a first group of channels, e.g. the odd ITU channels, is output the first output port 1350, while a second group of channels, e.g. the even ITU channels, is output a second output port 1355. As with the aforementioned dual GT interleaver, the modified SEI interleaver described above provides a flat top interleaver with low dispersion in the pass band (i.e. ±30 ps/nm).

Figure 13B:
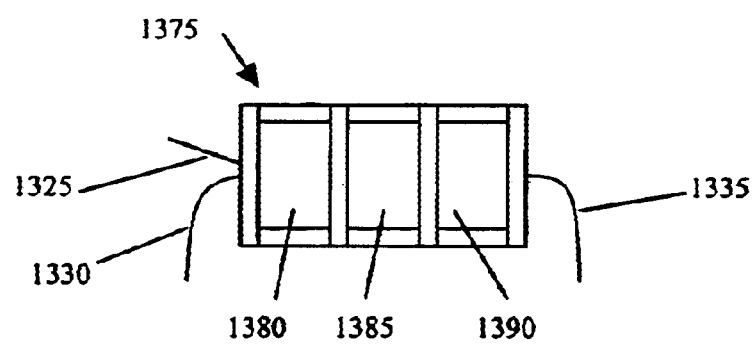
FIG. 13b illustrates the embodiment of FIG. 13a with a multi-cavity etalon.

FIG. 13b illustrates a multi-cavity version of the SEI, in which the etalon 1300 is replaced by a multi-cavity etalon 1375 including a first cavity 1380, a second cavity 1385, and a third cavity 1390.

Figure 14:
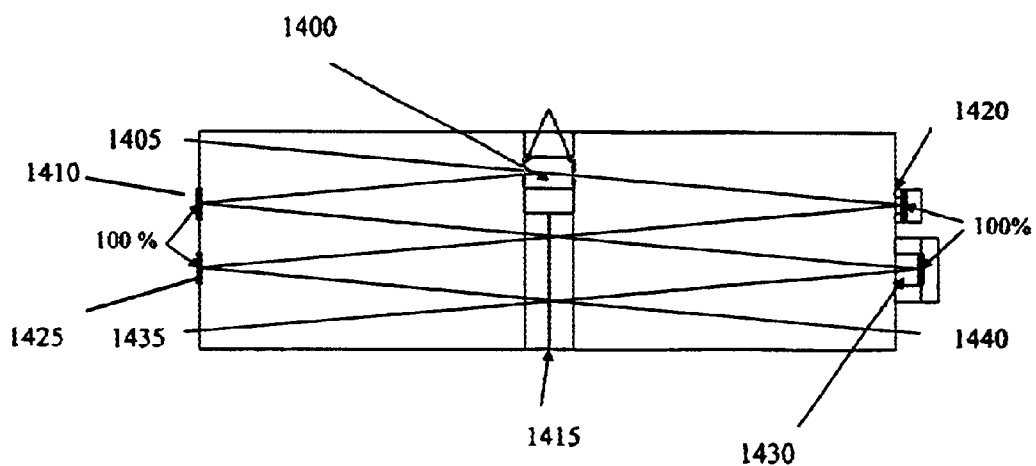
FIGS. 14 and 15 illustrate variations of the embodiment of FIG. 13.

A micro-optics version of the SEI interleaver is illustrated in FIG. 14. Instead of waveguides the transmitted and reflected fields travel through free space. A mirror 1410 reflects the reflected light from an etalon 1400 (single of multi-cavity) to a 50/50 beam splitter/combiner 1415, while a mirror 1420 reflects the transmitted light thereto. The mirror 1420 is recessed to provide the λ/4 path length difference. Similarly, a mirror 1425, directs the reflected light from the beam splitter/combiner 1415 back towards the beam splitter/combiner 1415 for recombining, while a mirror 1430 directs the transmitted light from the beam splitter/combiner 1415 back towards the beam splitter/combiner for recombining. The mirror 1430 is recessed to provide a path length difference of L. After recombination, the light containing a first set of channels, e.g. the odd ITU channels, is output a first output port 1435, while the light containing a second set of channels, e.g. the even ITU channels, is output a second output port 1440.

Figure 15:
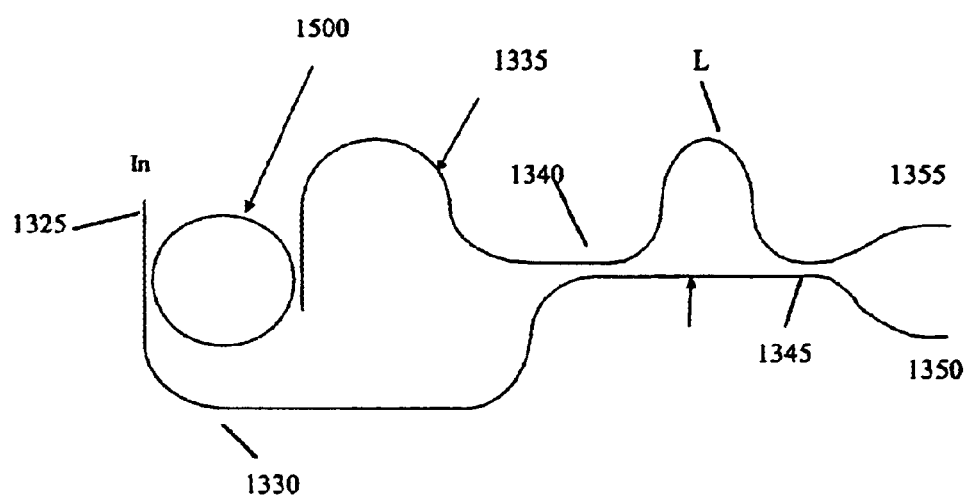

FIG. 15 illustrates an alternative version of an SEI interleaver of FIG. 13, in which a ring resonator 1500 replaces the etalon 1300. As before, a multi-ring resonator can replace the single ring resonator 1500. While various preferred embodiments have been shown and described above, it will be understood that there is no intent to limit the invention by such disclosure, but rather, it is intended to cover all modifications and alternate constructions falling within the spirit and scope of the invention, as defined in the appended claims. For example, specific reflectivity ranges are introduced to describe the preferred embodiment and should not be used to limit the scope of the present invention.

What is claimed is:

1. An interferometer with a predetermined free spectral range (FSR) comprising:

a first port for launching an input beam of light;

a first beamsplitter for splitting the input beam of light into a first sub-beam directed to follow a first optical path, and a second sub-beam directed to follow a second optical path;

a first resonator, having a first effective cavity length, for receiving said first sub-beam and for directing said first sub-beam to a first interference location;

a second resonator, having a second effective cavity length, for receiving said second sub-beam and for directing the second sub-beam to the first interference location for interference with the first sub-beam, thereby forming a first output signal comprising a first set of wavelength channels and a second output signal comprising a second set of wavelength channels;

a second port for outputting the first output signal; and a third port for outputting the second output signal;

wherein said first optical path and said second optical path have an effective optical path length difference approximately equal to one-half said first effective cavity length.

2. The interferometer according to claim 1, wherein said effective optical path difference is created by said first optical path being longer than said second optical path by approximately one-half said first cavity length.

3. The interferometer according to claim 2, wherein said first effective cavity length and said second effective cavity length are substantially equal to $2L=c/(2\times FSR\times\eta\times\cos(\theta))$; wherein c is the speed of light, $\eta$ is the index of refraction of the cavities in the first and second resonators, and $\theta$ is the angle of incidence of the sub-beams on the resonators.

4. The interferometer according to claim 1, wherein the first and second resonators are each a resonator selected from the group consisting of a GT etalon, a multi-cavity GT etalon, a ring resonator, and a multi-ring resonator.

5. The interferometer according to claim 4, wherein the first resonator comprises a first GT etalon and the second resonator comprises a second GT etalon; and wherein a first front reflective surface of said first GT etalon has a reflectivity that is 7 to 10 times greater than that of a second front reflective surface of said second GT etalon.

6. The interferometer according to claim 5, wherein the reflectivity of said first front reflective surface is between about 10% to about 60%; and wherein the reflectivity of said second front reflective surface is between about 1% to about 7%.

7. The interferometer according to claim 1, wherein said first and second effective cavity lengths are different; whereby said first resonator is de-phased from said second resonator, so that a positive dispersion slope of a dispersion profile of said first resonator is substantially aligned with a negative dispersion slope of a dispersion profile of said second resonator creating complementary dispersion profiles for decreasing overall dispersion of the interferometer.

8. The interferometer according to claim 7, wherein said first effective cavity length is approximately $2L=c/(2\times FSR\times\eta\times\cos(\theta))$, in which: c is the speed of light, $\eta$ is the index of refraction of the cavities in the first and second resonators, and $\theta$ is the angle of incidence of the sub-beams on the resonators;

wherein said second effective cavity length is approximately $2L+\alpha$, in which $\alpha$ equals $+/-n(FSR/2)$ or $+/-n(\lambda_c/4)$, in which $\lambda_c$ is the center wavelength of the input beam of light, and n is a natural number; and wherein said first path is substantially $L+\alpha$ longer than the second path.

9. The interferometer according to claim 8, wherein the first resonator is a first GT etalon and the second resonator is a second GT etalon; wherein a first front reflective surface of said first GT etalon has a reflectivity of between about 1% and about 5%; and wherein a second front reflective surface of said second GT has a reflectivity of between about 1% and about 5%.

10. The interferometer according to claim 1, wherein the beamsplitter separates the input beam of light into orthogonally polarized first and second sub-beams; and wherein a first polarization dependent delay section is positioned in the first optical path for creating the effective optical path difference between first and second components of the first sub-beam; and wherein a second polarization dependent delay section is positioned in the second optical path for creating the effective optical path difference between first and second components of the second sub-beam.

11. The interferometer according to claim 10, wherein each of said first and second polarization dependent delay sections comprises at least one birefringent crystal.

12. The interferometer according to claim 10, further comprising:

a first phase shifting element positioned in the first resonator for creating an effective cavity length difference for the first and second components of the first sub-beam; and a second phase shifting element positioned in the second resonator for creating an effective cavity length difference for the first and second components of the second sub-beam;

whereby dispersion of said first components cancels dispersion of said second components for decreasing overall dispersion of the first and second output signals.

13. The interferometer according to claim 10, wherein the first resonator comprises a first GT etalon and the second resonator comprises a second GT etalon; and wherein a first front reflective surface of said first GT etalon has a reflectivity of between about 1% and 5%; and wherein a second front reflective surface of said second GT has a reflectivity of between about 1% and 5%.

14. The interferometer according to claim 7, further comprising:

a second beam splitter for receiving said first output beam and for splitting said first output beam of light into a third sub-beam directed to follow a third optical path and a fourth sub-beam directed to follow a fourth optical path;

a third resonator having a third effective cavity length for receiving said third sub-beam and for directing the third sub-beam to a second interference point; and a fourth resonator having a fourth effective cavity length for receiving said fourth sub-beam and for directing the fourth sub-beam to the second interference point for interfering with the third sub-beam, thereby forming a third output beam comprising a third set of wavelength channels and a fourth output beam comprising a fourth set of wavelength channels;

wherein said third and fourth effective cavity lengths are different from each other and from the first and second effective cavity lengths; and wherein said third optical path and said fourth optical path having an effective optical path length difference that is correspondingly adjusted, whereby said third resonator is de-phased from said first, second and fourth resonators, whereby dispersion caused by said third resonator cancels dispersion caused by said fourth resonator, thereby decreasing overall dispersion of the first output beam.

15. The interferometer according to claim 14,
wherein said first effective cavity length is approximately $2L=c/(2\times FSR\times\eta\times\cos(\theta))$, in which: c is the speed of light, $\eta$ is the index of refraction of the cavities in the first and second resonators, and $\theta$ is the angle of incidence of the sub-beams on the resonators; wherein said second effective cavity length is approximately $2L+\alpha$, in which $\alpha$ equals $+/-n(FSR/2)$ or $+/-n(\lambda_c/4)$, in which $\lambda_c$ is the center wavelength of the input beam of light, and n is a natural number; wherein the third effective cavity length is approximately $2L+\alpha/2$; and wherein the fourth effective cavity length is approximately $2L+\alpha+\alpha/2$.

16. The interferometer according to claim 7,
wherein said first sub-beam is multi-passed through said first resonator, and said second sub-beam is multi-passed through said second resonator.

17. The interferometer according to claim 7,
wherein at least one of said first and second resonators is a multi-cavity GT etalon.

18. The interferometer according to claim 17,
wherein both of said first and second resonators are multi-cavity GT etalons and include first and second cavities;
wherein each of the first and second cavities of said first multi-cavity GT etalon has an effective cavity length of approximately $2L=c/(2\times FSR\times\eta\times\cos(\theta))$, in which: c is the speed of light, $\eta$ is the index of refraction of the cavities in the multi-cavity GT etalons, and $\theta$ is the angle of incidence of the sub-beams on the multi-cavity GT etalons;
wherein each of the first and second cavities of said second multi-cavity GT etalon has an effective cavity length of approximately $2L+\alpha$, in which $\alpha$ equals $+/-n(FSR/2)$ or $+/-n(\lambda_c/4)$, in which $\lambda_c$ is the center wavelength of the input beam of light, and n is a natural number; and
wherein the first path is substantially $L+\alpha$ longer than the second path.

19. The interferometer according to claim 18,
wherein a first front reflective surface of said first and second multi-cavity GT etalons has a reflectivity of substantially between 0% and 0.1%; wherein a second reflective surface of said first and second multi-cavity GT etalons has a reflectivity of substantially between 1% and 5%; and wherein a third reflective surface of said first and second multi-cavity GT etalons has a reflectivity of substantially between 95% and 100%; whereby dispersion caused by the first cavity is cancelled by dispersion caused by the second cavity.

20. The interferometer according to claim 17,
wherein said first resonator is a GT etalon, and said second resonator is a multi-cavity GT etalon including first and second cavities;
wherein the first or the second cavity of said second GT etalon has an effective cavity length of approximately $2L+\alpha$, in which $\alpha$ equals $+/-n(FSR/2)$ or $+/-n(\lambda_c/4)$, in which $\lambda_c$ is the center wavelength of the input beam of light, and n is a natural number;
wherein the first GT etalon has an effective cavity length of approximately $2L$; and
wherein the first path is substantially $L+\alpha$ longer than the second path.

21. The interferometer according to claim 20,
wherein said GT etalon and said multi-cavity GT etalon each have a front reflective surface with a reflectivity of substantially between 0% and 2%; wherein an intermediate reflective surface of said multi-cavity GT etalon has a reflectivity of substantially between 25% and 50%; and wherein said GT etalon and said multi-cavity GT etalon each have a rear reflective surface with a reflectivity of substantially between 95% and 100%.

22. The interferometer according to claim 7, further comprising a dispersion compensator optically coupled to the beamsplitter for providing the input beam of light a dispersion profile substantially complementary to a dispersion profile resulting from the interference of sub-beams from the first and second resonators, thereby decreasing overall dispersion in the first and second output signals.

23. The interferometer according to claim 22,
wherein the dispersion compensator comprises an etalon selected from the group consisting of a GT etalon with an FSR substantially the same as the FSR of the first and second resonators, and a Fabry-Perot etalon with an FSR substantially one half of that of the first and second resonators.

24. The interferometer according to claim 22,
wherein the dispersion compensator comprises an etalon selected from the group consisting of: a GT etalon with an FSR substantially the same as the FSR of the first and second resonators and including a front partially reflective surface having a reflectivity of between 0.001% and 0.1%; and a Fabry-Perot etalon with an FSR substantially one half of that of the first and second resonators and including first and second partially reflective surfaces each having a reflectivity of between 1% and 4%.

25. The interferometer according to claim 1, wherein
the first beamsplitter is a polarization dependent beamsplitter;
wherein the first sub-beam is orthogonally polarized to the second sub-beam;
further comprising a polarization dependent delay section producing an effective optical path length difference of approximately L between the first and second orthogonally polarized sub-beams; and
wherein the first and second resonators comprise a single resonator for receiving both the first and second sub-beams along independent paths having a cavity length of approximately $2L$;
whereby, when the orthogonally polarized first and second sub-beams are recombined, a series of wavelength channels with a predetermined polarization pattern are formed.

26. The interferometer according to claim 25, further comprising at least one phase biasing element disposed within the cavity of said single resonator to create a difference $\alpha$ in effective cavity lengths for the first and second sub-beams; and wherein said effective optical path difference is substantially equal to $L+\alpha$.

27. The interferometer according to claim 26, wherein
said cavity length is approximately $2L=c/(2\times FSR\times\eta\times\cos(\theta))$, in which: c is the speed of light, $\eta$ is the index of refraction of the cavity, and $\theta$ is the angle of incidence of the input beam on the resonator; and wherein said effective cavity length difference $\alpha$ is approximately equal to $+/-n(FSR/2)$ or $+/-n(\lambda_c/4)$, in which $\lambda_c$ is the center wavelength of the input beam of light, and n is a natural number.

28. The interferometer according to claim 27, wherein
said single resonator is a multi-cavity GT etalon including first and second cavities, each cavity having a cavity length of substantially 2L; wherein a first front reflective surface of said multi-cavity GT etalon has a reflectivity of substantially between 0% and 0.1%; wherein a middle reflective surface of said multi-cavity GT etalon has a reflectivity of substantially between 1% and 5%; and wherein a rear reflective surface of said multi-cavity GT etalon has a reflectivity of substantially between 95% and 100%; whereby dispersion caused by the first cavity is cancelled by dispersion caused by the second cavity.

* * * * *

UNITED STATES PATENT AND TRADEMARK OFFICE
CERTIFICATE OF CORRECTION

PATENT NO. : 6,683,721 B2
DATED : January 27, 2004
INVENTOR(S) : Copner et al.

It is certified that error appears in the above-identified patent and that said Letters Patent is hereby corrected as shown below:

Column 10,
Line 55, "lower relectivies" should read -- lower reflectivities --
Line 58, "reflectivity eof" should read -- reflectivity of --

Column 12,
Line 36, "optical axis at 450" should read -- optical axis at 45° --

Figure 11D:
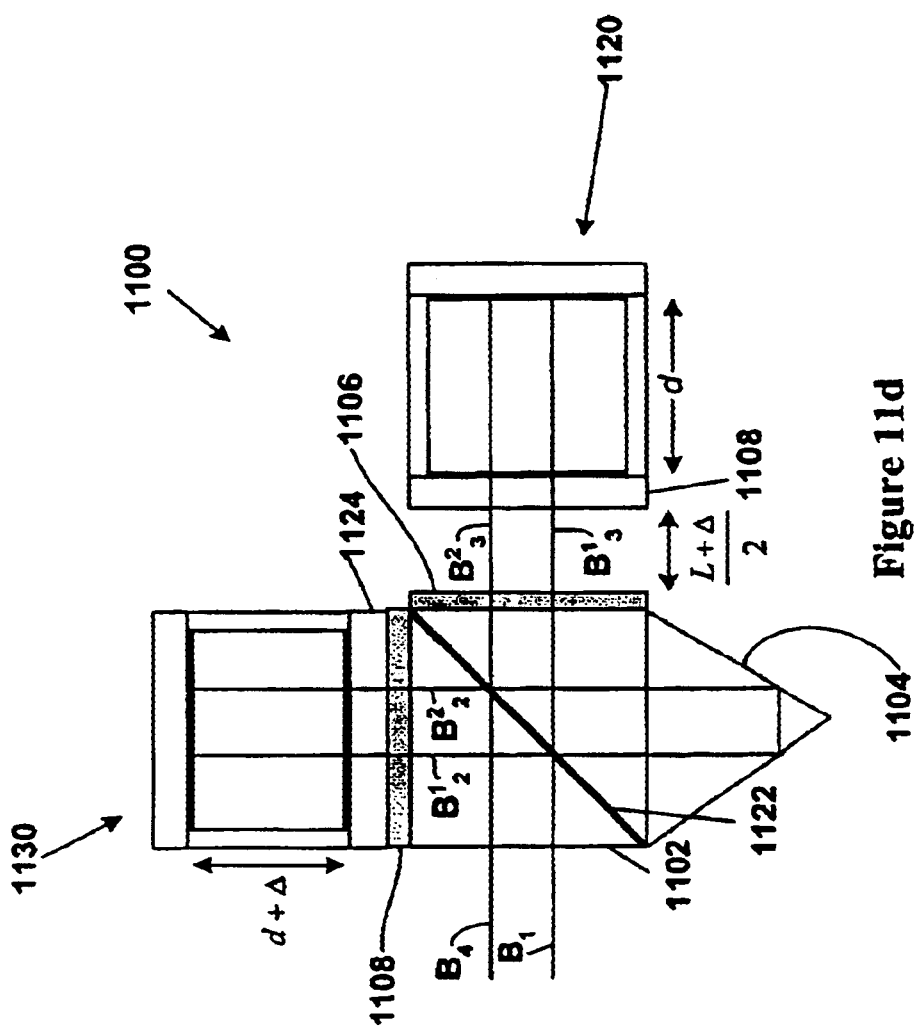
FIG. 11d illustrates one embodiment for multi-passing beams $B_2$ and $B_3$ through respective GT etalons based on polarization.

Column 16,
Line 64, "FIG. 1*d* illustrates" should read -- FIG. 11*d* illustrates --

Column 17,
Line 21, "$B^2_{2.\text{Beams}} B^2_{\ 2}$ and" should read -- $B^2_2$. Beams $B^2_2$ and $B^2_{\ 3}$ --

Signed and Sealed this

Sixth Day of July, 2004

JON W. DUDAS
*Acting Director of the United States Patent and Trademark Office*